(12) United States Patent
Teraoka et al.

(10) Patent No.: US 6,652,084 B1
(45) Date of Patent: Nov. 25, 2003

(54) INK-SET, INK-JET RECORDING METHOD, RECORDING UNIT, INK-CARTRIDGE, INK-JET RECORDING APPARATUS AND BLEEDING REDUCTION METHOD USING IT

(75) Inventors: Hisashi Teraoka, Kanagawa-Ken (JP); Yoichi Takada, Kanagawa-Ken (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/675,004

(22) Filed: Sep. 29, 2000

(30) Foreign Application Priority Data

Sep. 30, 1999 (JP) .......................................... 11-280110

(51) Int. Cl.$^7$ ................................................. B41J 2/01
(52) U.S. Cl. ........................... 347/100; 347/96; 347/95; 106/31.13
(58) Field of Search .......................... 347/100, 96, 101; 106/31.27, 31.28, 31.13, 31.6

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,555,008 A | 9/1996 | Stoffel et al. | 347/100 |
| 5,853,465 A * | 12/1998 | Tsang et al. | 347/100 |
| 5,985,015 A * | 11/1999 | Kanaya | 106/31.6 |
| 6,022,908 A * | 2/2000 | Ma et al. | 106/31.28 |
| 6,187,086 B1 * | 2/2001 | Rehman | 106/31.28 |

FOREIGN PATENT DOCUMENTS

| | | | | |
|---|---|---|---|---|
| EP | 633142 | | 1/1995 | |
| EP | 0838507 A1 | * | 4/1998 | ............ C09D/11/00 |
| EP | 0879857 A2 | * | 11/1998 | .............. B41J/2/01 |
| JP | 54-56847 | | 5/1979 | |
| JP | 59-123670 | | 7/1984 | |
| JP | 59-138461 | | 8/1984 | |
| JP | 60-71260 | | 4/1985 | |
| JP | 7-145336 | | 6/1995 | |
| JP | 8-239610 | | 9/1996 | |
| JP | 2783647 | | 5/1998 | |
| JP | 10-183046 | | 7/1998 | |

OTHER PUBLICATIONS

U.S. patent application No. 09/675,216, filed Sep. 29, 2000.

* cited by examiner

Primary Examiner—Stephen D. Meier
Assistant Examiner—Manish Shah
(74) Attorney, Agent, or Firm—Fitzpatrick, Cella, Harper & Scinto

(57) ABSTRACT

An ink set for recording a color image on a recording medium by using ink of two or more colors including at least a black ink and a color ink, wherein the black ink includes a pigment having a cationic group or a pigment and a pigment dispersant having a cationic group, and a resin encapsulating a coloring material, and the color ink includes an anionic dye and an anionic substance, which can form a print excellent in the rub-off resistance and line marker resistance without bleeding between black and color images.

19 Claims, 15 Drawing Sheets

INK-SET, INK-JET RECORDING METHOD, RECORDING UNIT, INK-CARTRIDGE, INK-JET RECORDING APPARATUS AND BLEEDING REDUCTION METHOD USING IT

BACKGROUND OF THE INVENTION

1. Field of the Invention

The present invention relates to an ink set for color ink-jet recording, ink-jet recording method, recording unit, ink-cartridge, ink-jet recording apparatus and bleed-alleviation method, to obtain color images of high density, grade, sharpness and quality by the ink-jet recording even on plain paper.

2. Related Background Art

Heretofore, in order to form a black image which is excellent in optical density, printing grade, water resistance, and lightfastness on plain paper by the ink-jet recording system, there has been proposed use of black pigment ink. Besides, there have been proposed an ink set which would not cause bleeding at the boundary between an image printed with black ink and an image printed with color ink, as well as the ink-jet recording method or apparatus using it. For example, in Japanese Patent Application Laid-Open No. 10-183046, there is described an ink set capable of reducing bleeding by combination use of a black ink containing a carbon-black pigment having a cationic group on its surface as a coloring material, and a color ink containing an anionic dye as the color material.

A large number of means for improving the optical density and water resistance of recorded images have been proposed to date. As one of the solutions thereof, it is proposed to prepare an ink containing a pigment dispersed in water as a coloring material. For example, Japanese Patent Application Laid-Open No. 8-239610 discloses an aqueous pigment composition for ink-jet recording containing colored resin and a humectant as essential components. As such an ink, there is an ink using carbon black as a coloring material. Such an ink can give images of high optical density and excellent water resistance. However, even such recorded images still need improvement in rub-off resistance and resistance to line marker, particularly on plain paper. However, in the method as described in Japanese Patent Application Laid-Open No. 7-145336, where bleeding in multicolor printing is suppressed by mutual contact between an anionic ink and a cationic ink in the presence of a polymer, the polymer may adversely affect the ink reliability depending on the polymer type. This poor reliability means, if there is a certain time interval, one minutes, for example, between the ink ejection performance from a nozzle in recording, it may happen that the next ink droplet cannot be ejected steadily, causing disturbed printing (such a phenomenon is called "poor ejectability").

Besides, the method described in the above Japanese Patent Application Laid-Open No. 10-183046 uses a combination of a black ink using cationic carbon black and a color ink using an anionic dye, and the aggregates formed between the coloring materials suppress bleeding. However, with the ink-jet inks of which coloring material concentrations are not so high as to cause sufficient aggregation, there may happen, especially on the recording paper of high permeability such as normal paper, bleeding between black and color images, or a phenomenon called "haze" in the black image. Here, haze, a whitish black region which should be solid black, is caused as the black ink is drawn deep into the paper by the action of highly penetrable color ink in the boundary region between a color image and a black image, when the black ink and the color ink are applied in the same scan.

According to the study by the present inventors on the above mentioned ink-jet ink containing a pigment, colored resin and a humectant as the essential components, the upper limit for each component is automatically determined when the ink ejection stability is considered. Thus, the amount of the pigment which determines the image density and the amount of the colored resin which determines the image fixability must be selected arbitrary considering the balance between the image density and image fastness. Accordingly, the conventional pigment ink is still not making the best use of pigment as a coloring material.

More specifically, Japanese Patent Application Laid-Open No. 8-239610 explains in the specification thereof that the colored resin is a dispersion of a resin colored by a dye. According to the preparation process of the colored resin described in the Example thereof, a dye is first added to an emulsion of a resin, and the mixture is heated to about 80° C. and then cooled, thereby preparing the colored resin. However, in page 4, left column, lines 38 to 41 of this patent specification, it is described that "In order for the dye to be sufficiently taken in the resin, the amount (of the dye) is preferably 10 parts or less, particularly 8 parts or less, per 100 parts of the resin". In each of the preparation processes described in Preparation Examples 8 to 13 of the specification, a mixing proportion of the dye to the solid resin content in the emulsion polymer is described as about 1:10 to 1:12 (dye:resin).

According to the investigation by the present inventors, however, it has been concluded that when such a colored resin as described in Japanese Patent Application Laid-Open No. 8-239610 is used, sometimes such a proportion of the dye to the colored resin as described in the specification is not sufficient. That is, when a colored resin is added to the ink to enhance the fixability of the pigment ink to the recording medium, the amount of the pigment which can be included in the ink becomes low. If the colored resin is added more to the ink to compensate for the reduction in optical density due to the reduction of amount of the pigment or, further, to obtain sufficient image density, it is inferred that the resin content may exceed the range which enables precise ejection of the ink by an ink-jet recording system.

As described above, from the investigations as to the prior art, the present inventors have reached a conclusion that the development of a new technique entirely different from the conventional techniques is required for further improvements in optical density and image fixing ability in pigment inks.

SUMMARY OF THE INVENTION

Accordingly, it is an object of the present invention to provide an ink set of black ink and color ink for ink jet recording, which can provide images of high optical density and high print grade as required for black image, and color images of images being excellent in rub-off resistance, water resistance and resistance to line marker in comparison with conventional pigment ink, which is excellent in reliability as the ink-jet ink such as storage stability, wettability to the head face, clogging resistance, and printing durability, and moreover which is highly effective in alleviating bleeding when used in a multi-color printing. The other object of the present invention is to provide an ink-jet recording method, and ink-jet recording apparatus which can achieve above mentioned advantages.

According to one embodiment of the present invention, there is provided an ink set for recording a color image on a recording medium by using ink of two or more colors comprising a black ink and a color ink, wherein the black ink comprises a first pigment having a cationic group or a pigment and a pigment dispersant having a cationic group, and a resin encapsulating a coloring material, and the color ink comprises an anionic dye and an anionic substance.

According to another embodiment of the present invention, there is provided an ink jet recording method comprising the steps of:

ejecting a black ink from an orifice in response to a recording signal to attach the black ink on a recording medium; and ejecting a color ink from a orifice in response to a recording signal to attach the color ink on the recording medium, wherein the black ink comprises a pigment having a cationic group or a pigment and a pigment-dispersant having a cationic group, and a resin encapsulating a coloring material, and the color ink comprises an anionic dye and an anionic substance.

According to a further embodiment of the present invention, there is provided a recording unit comprising:

a first ink container containing a black ink;

a second ink container containing a color ink; and a head for ejecting the black ink contained in the first ink container and the color ink contained in the second ink container, wherein the black ink comprises a pigment having a cationic group or a pigment and a pigment-dispersant having a cationic group, and a resin encapsulating a coloring material, and the color ink comprises an anionic dye and an anionic substance.

According to a still further embodiment of the present invention, there is provided an ink cartridge comprising:

a first ink container containing a black ink; and a second ink container containing a color ink;

wherein the black ink comprises a pigment having a cationic group or a pigment and a pigment-dispersant having a cationic group, and a resin encapsulating a coloring material, and the color ink comprises an anionic dye and an anionic substance.

According to a still further embodiment of the present invention, there is provided an ink jet recording apparatus comprising:

a first ink container containing a black ink; and a second ink container containing a color ink; and a head for ejecting each of the black ink and the color ink, wherein the black ink comprises a pigment having a cationic group or a pigment and a pigment-dispersant having a cationic group, and a resin encapsulating a coloring material, and the color ink comprises an anionic dye and an anionic substance.

According to a still further embodiment of the present invention, there is provided a method for alleviating bleeding in a boundary between a black image formed by an ink-jet method with a black ink and a color image formed by an ink-jet method with a color ink, wherein the black ink comprises a pigment having a cationic group or a pigment and a pigment-dispersant having a cationic group, and a resin encapsulating a coloring material, and the color ink comprises an anionic dye and an anionic substance.

DETAILED DESCRIPTION OF THE PREFERRED EMBODIMENTS

Figure 1:
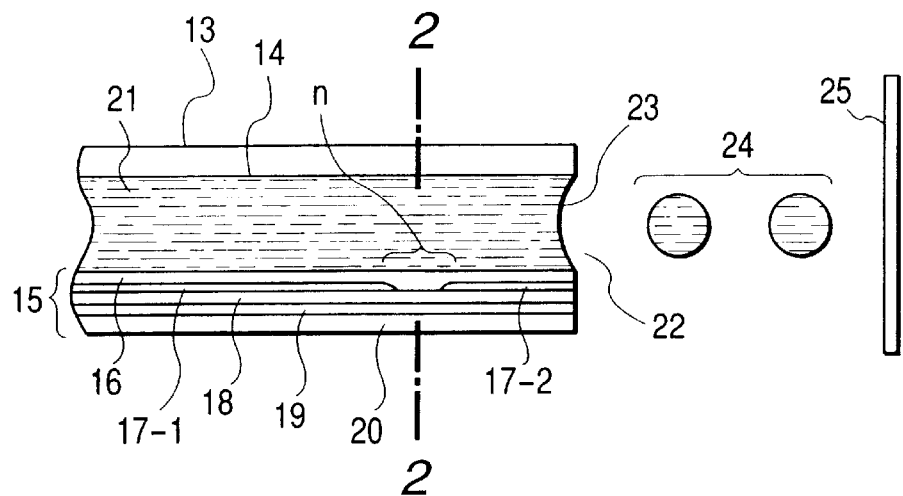
FIG. 1 is a vertical sectional view of an ink-jet recording apparatus head.

Referring to the preferred embodiments of the present invention, the present invention will be described in details below.

As a result of hard and intensive study to solve the above technical problems, the present inventors have solved the problem involved in a pigment ink while retaining the most of the merit of using a pigment such as carbon black etc. as the coloring material, and further found out a highly effective method to alleviate bleeding when the black pigment ink is used with color ink for the multicolor printing, thus leading to the present invention.

Namely, by using a black ink containing a resin encapsulating a colorant, and a pigment having a cationic group or a pigment and a pigment dispersant having a cationic group, it is possible to solve the problem that the images formed on plain paper is inferior in rub off resistance or line marker resistance, without spoiling the merit of pigment ink that recorded images are high in image density and excellent in water resistance. Further, by using an ink set which comprises black ink of the above constitution and color ink containing an anionic dye and at least one anionic substance, it becomes possible to alleviate bleeding which occurs between a black image and a color image, or haze which occurs in the black image existing near the color image, these bleeding and haze still being observed even when a conventional ink set is used which is said to reduce bleeding by aggregation between cationic coloring material and anionic coloring material.

Now, we will explain the black ink and color ink constituting an the ink set of the invention.

The black ink comprises a pigment containing a cationic group, or a pigment and a pigment dispersant containing a cationic group, and a resin encapsulating a coloring material therein. As the coloring material in color ink used for color image formation, an anionic coloring material is often used from the viewpoint of color, light fastness or safety. For this reason, the use of a cationic coloring material for the color ink is desired to suppress the bleeding in an image formed of black ink and color ink. As the pigment suitable for black ink, there is carbon black.

Thus, when carbon black is used as the pigment of the black ink, a dispersant having a cationic group is preferably used with carbon black, or carbon black to the surface of which a cationic group is bonded is preferably used. Further, when the carbon black has at least one cationic hydrophilic group bonded directly or via an atomic group to the surface, the carbon black becomes self-dispersible, which can significantly reduce the amount of or dispense with a dispersant which should be added to ordinary pigment ink. Thereby, the ink reliability in the ink-jet recording (discharge durability, discharge stability, clogging resistance, clogging resistance) can be improved even for pigment ink.

The color ink may contain not only an anionic dye as the conventional color ink but also at least one sort of anionic substance, to intensify the aggregation force between the black ink and the color ink when they are brought into contact on a recording medium. Thus, bleeding between the black color image and the color ink image can be alleviated more effectively.

The anionic substance may preferably be a substance having a carboxyl group or a sulfo group is preferable, and more preferably a substance having a plurality of sulfo groups. Specifically, a substance having an aromatic ring substituted with a sulfo group, more preferably, with a plurality of sulfo groups can be used. This is considered due to the stronger cohesion of the sulfo group with a cationic group. Furthermore, the use of a substance having a plurality of sulfo groups can intensify the cohesive force with a cationic group still more. Thus, bleeding-alleviating effect will be enhanced even when the black and color inks are applied in one scan. Besides, it is preferable in the present invention to use an anionic dye having a sulfo group in the color ink.

The ink set according to the present invention aims at the alleviation of bleeding between the black ink image and the color ink image as mentioned above, and does not consider bleeding between different color ink images. Since color ink is frequently used for images, graphs etc., substantial deterioration in the printing grade in practical use can be prevented by using a known method such as providing the ink with a fast penetrability even into a sized paper.

Next explained are the respective compositions for the black ink and the color ink. The black ink contains a resin encapsulating a coloring matter therein, a pigment having a cationic group or a pigment and a pigment-dispersant having a cationic group, and the color ink contains an anionic dye and at least an anionic substance. One of the preferable embodiments of the black ink is a black ink containing a pigment having a cationic group or a pigment and a pigment-dispersant having a cationic group and a coloring material-encapsulating resin having a cationic hydrophilic group on its surface. One of the preferable embodiments of the color ink is a color ink containing an anionic substance having a sulfo group.

First, the black ink constituting an ink set of the invention is explained. As mentioned above, the black ink may preferably contain a pigment having a cationic group or a pigment and a pigment-dispersant having a cationic group, and a resin encapsulating a coloring material in it, to which aqueous medium to disperse the pigment and optionally other additives may be added.

Each of the material constituting the black ink will now be explained in the following order;

(1) resin encapsulating a coloring material,
(2) pigment dispersion where pigment or pigment dispersant is cationic,
(3) aqueous medium and other additives.

(1) Resin Encapsulating a Coloring Material:

The resin encapsulating a coloring material will hereinafter be described.

Examples of the resin encapsulating a coloring material may include a resin which encapsulates a coloring material in the form of microcapsules, and an aqueous dispersion of a resin having a cationic group, which encapsulates a coloring material, the aqueous dispersion being obtainable by emulsifying a dye or pigment dissolved into an oily solvent. In particular, the microcapsule resin encapsulating the coloring material is preferred.

More specifically, in the case where a hydrophobic coloring material, for example, an oil color or a pigment, is used as the coloring material, it is considered that since the coloring material and the hydrophobic moiety of the resin are easy to interact with each other by the microcapsulization, the hydrophobic moiety of the resin becomes hard to be oriented toward a water system. As a result, it is expected that when an ink-jet ink comprising such a resin encapsulating the coloring material is ejected from an ink-jet printer, the resin is prevented from depositing to and accumulating on the nozzle-formed surface of an ink-jet head subjected to a water-repellent treatment, and so such a resin contributes to a further improvement in the ejection stability of the ink over a long period of time.

The resin with the coloring material microcapsulized therein is a resin dispersion obtained by dissolving or dispersing the coloring material in an oily solvent, emulsifying and dispersing the solution or dispersion thus obtained in water and then microcapsulizing the resultant emulsion by a proper method conventionally known.

As the coloring material, there may preferably be used a water-insoluble coloring material, for example, a pigment or oil-soluble dye. Namely, the water-insoluble coloring material is suitable for preparing the resin microcapsulizing the coloring material therein. Specifically, carbon black or the like may be used as a pigment for black (Bk). As the carbon black, may preferably be used ones which are produced in accordance with the furnace process or channel process and have such properties that the primary particle diameter is from 15 to 40 nm, the specific surface area is from 50 to 300 $m^2/g$ as measured by the BET method, the oil absorption is from 40 to 150 ml/100 g as determined by using DBP, the volatile matter is from 0.5 to 10%, and the pH is from 2 to 9. Examples of commercially-available carbon black having such properties include No. 2300, No. 900, MCF88, No. 33, No. 40, No. 45, No. 52, MA7, MA8 and No. 2200B (all, products of Mitsubishi Chemical Industries Limited), RAVEN 1255 (product of Columbian Carbon Japan Limited), REGAL 400R, REGAL 330R, REGAL 660R and MOGUL L (all, products of CABOT Co.), and Color Black FW-1, Color Black FW18, Color Black S170, Color Black S150, Printex 35 and Printex U (all, products of Degussa AG).

As the oil-soluble dye, may preferably be used the following dyes:

C.I. Solvent Yellow 1, 2, 3, 13, 19, 22, 29, 36, 37, 38, 39, 40, 43, 44, 45, 47, 62, 63, 71, 76, 81, 85 and 86;

C.I. Solvent Red 8, 27, 35, 36, 37, 38, 39, 40, 58, 60, 65, 69, 81, 86, 89, 91, 92, 97, 99, 100, 109, 118, 119 and 122;

C.I. Solvent Blue 14, 24, 26, 34, 37, 38, 39, 42, 43, 45, 48, 52, 53, 55, 59 and 67; and C.I. Solvent Black 3, 5, 7, 8, 14, 17, 19, 20, 22, 24, 26, 27, 28, 29, 43 and 45.

Various kinds of conventionally known water-soluble dyes may also be used so far as the counter ions thereof (usually, sodium, potassium or ammonium ion) are replaced by an organic amine or the like.

It is preferred that a coloring material having the same color tone as the pigment, which will be described subsequently, be selected from among the various kinds of coloring materials described above in order to, for example, adjust or compensate for the color tone of the pigment. The optical density of the resulting recorded image can be thereby further enhanced. For example, when carbon black is used as the pigment as will be described subsequently, it is preferred that carbon black be also used as the coloring material. Two or more coloring materials may be used as the coloring material encapsulated in the resin.

In this case, the respective coloring materials may be encapsulated in either different resins or a resin in common with the coloring materials.

A process for preparing the resin with the coloring material encapsulated in a microcapsule in the resin as the resin encapsulating the coloring material will hereinafter be described.

The coloring material is first dissolved or dispersed in an oily solvent, and the oily solvent is then emulsified and dispersed in water. Examples of a method for emulsifying and dispersing the oily solvent with the coloring material dissolved or dispersed therein in water, may be mentioned a dispersion method by ultrasonic wave and methods using various kinds of dispersing machines or stirring machines. At this time, various kinds of emulsifiers and/or dispersants, and moreover emulsification or dispersion aids such as protective colloid may also be used as needed.

As these emulsifiers and dispersion aids, there may be used polymeric substances such as PVA, PVP and gum arabic, and besides anionic surfactants, nonionic surfactants and the like. Examples of a method for microcapsulizing the above emulsion include a method in which the coloring material and the resin are dissolved in a water-insoluble organic solvent (oily solvent), and the solution is subjected to phase inversion into a water system, thereby conducting phase-inversion emulsification, an interfacial polymerization method in which a polymerization reaction is caused at an interface between an organic phase and an aqueous phase to conduct microcapsulization, the so-called in-situ polymerization method in which a material capable of forming a wall to an organic phase alone is dissolved or co-existed, thereby forming microcapsules, and a coacervation method in which the pH, temperature, concentration and the like of an aqueous solution of a polymer are changed, thereby phase-separating a concentrated phase of the polymer to form microcapsules. After the formation of microcapsules, a step of removing the oily solvent is added. The average particle diameter of the resin encapsulating the coloring material obtained in the above-described manner is preferably within a range of from 0.01 to 2.0 $\mu$m, more preferably from 0.05 to 1 $\mu$m.

In the present invention, the resin encapsulating the coloring material obtained in the above-described manner preferably has a cationic hydrophilic group on its surface. Such a resin can be preferably prepared from a monomer or a salt thereof as shown below. For example, there are N,N-dimethyl-aminoethyl methacrylate [$CH_2=C(CH_3)$—COO—$C_2H_4N(CH_3)_2$], N,N-dimethylaminoethyl acrylate [$CH_2=CH$—COO—$C_2H_4N(CH_3)_2$], N,N-dimethylaminopropyl methacrylate [$CH_2=C(CH_3)$—$COOC_3H_6N$—$(CH_3)_2$], N,N-dimethylaminopropyl acrylate [$CH_2=CH$—COO—$C_3H_6N(CH_3)_2$], N,N-dimethylacrylamide [$CH_2=CH$—$CON(CH_3)_2$], N,N-dimethylmethacrylamide [$CH_2=C(CH_3)$—$CON(CH_3)_2$], N,N-dimethylaminoethyl acrylamide [$CH_2=CH$—$ONHC_2H_4N(CH_3)_2$], N,N-dimethylaminoethyl methacrylamide [$CH_2=C(CH_3)$—CONH—$C_2H_4N(CH_3)_2$], N,N-dimethylaminopropyl acrylamide [$CH_2=CH$—$CONHC_3H_6N(CH_3)_2$] and N,N-dimethylaminopropyl methacrylamide [$CH_2=C(CH_3)$—$CONHC_3H_6N(CH_3)_2$].

To form a salt (tertiary amine), hydrochloric acid, sulfuric acid and acetic acid can be used.

Examples of a compound used in quaternization include methyl chloride, dimethylsulfuric acid, benzyl chloride and epichlorohydrin.

(2) Pigment Dispersant Containing a Pigment Having Cationic Group, or a Cationic Pigment-dispersant.

As the pigment to be used for the ink set, the conventionally known carbon black and organic pigments may be used without any problem. However, particularly preferred is a self-dispersing carbon black to the surface of which at least one cationic hydrophilic group is bonded directly or through another atomic group. Specific examples thereof will hereinafter described.

<Cationically Charged Carbon Black>

Examples of cationically charged carbon black include those obtained by bonding at least one selected from the following cationic groups to the surface of carbon black.

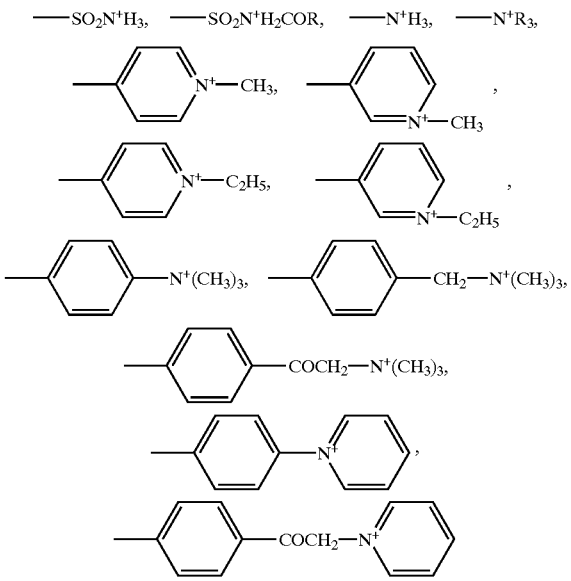

In the above formulae, R is a straight or branched alkyl group having 1 to 12 carbon atoms, a substituted or unsubstituted phenyl group or a substituted or unsubstituted naphthyl group.

A preparation method of the cationically charged self-dispersible carbon black due to its hydrophilic group is explained with a method to introduce to carbon black an N-ethylpyridyl group:

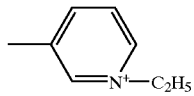

to the surface of carbon black.

Because of excellent water dispersibility due to the repulsion of ions, the cationically charged carbon black due to the hydrophilic group introduced onto the surface thereof as mentioned above retains a stable dispersion state without addition of a dispersant even in an aqueous ink.

Meanwhile, various hydrophilic groups as mentioned above may be bonded directly to the surface of black carbon, or may be indirectly bonded via an atomic group laid between the surface and the hydrophilic group. Here, specific examples of such an atomic group include straight or branched alkylene groups having 1 to 12 carbon atoms, substituted or unsubstituted phenylene groups and substituted or unsubstituted naphthylene groups. As the substituents for the phenylene groups and naphthylene groups, there are straight or branched alkyl groups having 1 to 6 carbon atoms.

Specific examples of combinations of the atomic group and the hydrophilic group include, but not limited to, $-C_2H_4-COOM$, $-Ph-SO_3M$ and $Ph-COOM$, where Ph represents a phenyl group and M represents hydrogen, an alkaline metal, ammonium, or organic ammonium.

Specific examples of alkaline metal are Li, Na, K, Rb and Cs, and those of organic ammonium are methyl ammonium, dimethyl ammonium, trimethyl ammonium, ethyl ammonium, diethyl ammonium, triethyl ammonium, monohydroammonium, monohydroxymethylamine, dihydroxymethylamine, trihydroxymethylamine, ethanol ammonium, diethanol ammonium, and triethanol ammonium.

In this invention, the self-dispersible carbon black to be used as a coloring material for an ink is not necessarily one kind, but two or more of the self-dispersing carbon blacks described above may be suitably selected and used. The amount of the self-dispersing carbon black to be added in the ink is preferably within a range of from 0.1 to 15% by weight, particularly from 1 to 10% by weight, based on the total weight of the ink. When the self-dispersing carbon black is in this range, good dispersion state can be maintained in ink.

In this embodiment, not only the self-dispersing carbon black having a cationic group but also a pigment dispersion in which the conventionally known carbon black as described above is dispersed by a dispersant having a cationic group may be used. The term "a pigment dispersant" herein used means "a dispersant for dispersing a pigment". Examples of the dispersant having a cationic group include polymer dispersant obtainable by polymerization of vinyl monomers, at least part of which is made of cationic monomers, and cationic surface active materials of amine salt or quaternary ammonium salt type.

Examples of a cationic monomer constituting at least a part of the polymers include salts of a tertiary amine monomer and quaternarized compounds thereof, including N,N-dimethylaminoethyl methacrylate $[CH_2=C(CH_3)-COO-C_2H_4N(CH_3)_2]$, N,N-dimethylaminoethyl acrylate $[CH_2=CH-COO-C_2H_4N(CH_3)_2]$, N,N-dimethylaminopropyl methacrylate $[CH_2=C(CH_3)-COO-C_3H_6N(CH_3)_2]$, N,N-dimethyl-aminopropyl acrylate $[CH_2=CH-COO-C_3H_6N(CH_3)_2]$, N,N-dimethylacrylamide $[CH_2=CH-CON(CH_3)_2]$, N,N-dimethyl-methacrylamide $[CH_2=C(CH_3)-CON(CH_3)_2]$, N,N-dimethyl-aminoethyl acrylamide $[CH_2=CH-CONHC_2H_4N(CH_3)_2]$, N,N-dimethylaminoethyl methacrylamide $[CH_2=C(CH_3)-CONH-C_2H_4N(CH_3)_2]$, N,N-dimethylaminopropyl acrylamide $[CH_2=CH-CONHC_3H_6N(CH_3)_2]$ and N,N-dimethylaminopropyl methacrylamide $[CH_2=C(CH_3)-CONHC_3H_6N(CH_3)_2]$.

Salt of a tertiary amine is formed, for example, with hydrochloric acid, sulfuric acid and acetic acid. Examples of a compound used in quaternization include methyl chloride, dimethylsulfuric acid, benzyl chloride and epichlorohydrin, between which methyl chloride and dimethylsulfuric acid are preferred for forming the dispersant used in this embodiment. Such tertiary amine salts and quaternary ammonium compounds as described above act as cations in water, and in the neutralized state, they are stably soluble in an acidic region. The content of these monomers in their corresponding copolymers is preferably within a range of from 20 to 60% by weight.

Examples of other monomers to be used for constituting the above-described cationic polymer dispersants include acrylic esters having a hydroxyl group, such as 2-hydroxyethyl methacrylate and acrylic esters having a long ethylene oxide chain at their side chains, hydrophobic monomers such as styrenic monomers, and water-soluble monomers soluble in water at about pH 7, such as acrylamides, vinyl ethers, vinylpyrrolidones, vinylpyridines, and vinyloxazolines. As the hydrophobic monomers, styrene, styrene derivatives, vinylnaphthalene, vinylnaphthalene derivatives, alkyl esters of (meth)acrylic acid and acrylonitrile can be used.

In the polymer dispersant obtained by copolymerization, it is preferred that the water-soluble monomer be used in a range of from 15 to 35% by weight in order to stabilize the copolymer in an aqueous solution, while the hydrophobic monomer be used in a range of from 20 to 40% by weight in order to enhance the dispersing effect of the copolymer to the pigment.

Upon use of the above-described cationic water-soluble polymer as a dispersant to disperse a pigment, it is preferred from the viewpoint of physical properties to use a pigment adjusted so as to have an isoelectric point of at least 6, or such a pigment that the characteristic pH of a simple aqueous dispersion of the pigment is neutral or basic, for example, from 7 to 10. Such a pigment is preferred from the viewpoint of dispersibility since the ionic interaction between the pigment and the cationic water-soluble polymer is considered strong.

In order to obtain a fine particulate aqueous dispersion of a pigment using such a material as described above, for example, carbon black is premixed in a solution of the cationic dispersant and subsequently milled in a dispersing machine at a high shear rate. After dilution, the mixture is centrifuged to remove coarse particles. Thereafter, materials necessary for the desired ink formulation are added, and the resulting mixture is aged if necessary. Thus, an aqueous dispersion of a pigment having the desired average particle diameter can be obtained. The pH of the ink thus prepared is preferably adjusted to a range of from 3 to 7.

(3) Aqueous Medium, and Other Additives

The black ink constituting an ink set according to the present invention comprises (1) a resin encapsulating a coloring material as explained above, and (2) a pigment dispersion of a cationic pigment or a pigment and a cationic pigment dispersant as described above, both in an aqueous medium in a dispersion state. Any medium can be used as the aqueous medium so long as it contains water. The water content in the ink is, e.g. 20 to 95 wt %, especially 40 to 95 wt % by weight, more preferably 60 to 95 wt % to the total ink weight.

In addition to water, the aqueous medium may contain following water-soluble organic solvents. Appropriate examples are C1 to C4 alkyl alcohols (e.g. methyl alcohol, ethyl alcohol, n-propyl alcohol, isopropyl alcohol, n-butyl alcohol, sec-butyl alcohol and tert-butyl alcohol); ketones or keto-alcohols (e.g. ketoamides such as dimethyl formamide and dimethyl acetamide, acetone and diacetone alcohols); ethers (e.g. tetrahydrofuran and dioxane); polyalkylene glycols (e.g. polyethylene glycol and polypropylene glycol); alkylene glycols with C2–C6 alkylene group (e.g. ethylene glycol, propylene glycol, butylene glycol, triethylene glycol, 1,2,6-hexane triol, thiodiglycol, hexylene glycol and diethylene glycol); alkylethers of polyvalent alcohols (e.g. ethylene glycol methyl ether, ethylene glycol ethyl ether, triethylene monomethyl ether and triethylene glycol monoethyl ether) and further N-methyl-2-pyrrolidone, 2-pyrrolidone, 1,3-dimethyl-2-imidazolidinone and so on. The total amount of the water-soluble organic solvent in the ink ranges from 2 to 60% by weight, more preferably, from 5 to 25% by weight on the basis of the total ink weight.

A specifically preferable water-soluble organic solvent in the present invention is glycerol added in an amount from 2 to 30% by weight, more preferably, from 5 to 15% by weight to the ink. Another preferable water-soluble organic solvent is a solvent mixture containing glycerol and a polyvalent alcohol (e.g. diethylene glycol and ethylene glycol) at a mixing ratio of glycerol to the polyvalent alcohol from 10:5 to 10:50. Examples of other preferable polyvalent alcohols to be mixed with glycerol are diethylene glycol, ethylene glycol, polyethylene glycol and propylene glycol. The above mentioned glycerol or mixture of glycerol and polyvalent alcohol may be mixed with another water-soluble organic solvent.

The black ink constituting an ink set of the present invention is suitable to be used in an ink-jet recording method, where an image is recorded by discharging the ink from a recording head, by means of thermal energy or mechanical energy, and attaching it to a recording medium. Thus, in order to be suitable for ink-jet recording, the black ink of the above constitution preferably has following physical properties at 25° C.; surface tension: 15 to 60 mN/m (dyne/cm), more preferably 20 to 50 mN/m (dyne/cm); viscosity: 15 mPa·s (cP) or less, more preferably, 10 mPa·s (cP) or less, further preferably 5 mPa·s (cP) or less; pH: 3 to 11, more preferably 3.5 to 8.

Specific compositions of the black ink which satisfy the above characteristics can be those used in the following Examples. In addition to the resin encapsulating coloring material and the pigment as described above, if necessary, the black ink used in the present invention may further contain various additives such as, surfactant, pH control agent and antimold.

An ink set according to the present invention is characterized in that the black ink of the above mentioned constitution is used in combination with a color ink containing at least one anionic dye and at least one anionic substance. Such a color ink is described below on its constituents.

First, as an anionic dye preferable for the color ink constituting an ink set of the invention, most of already present, or newly synthesized anionic dyes can be used so long as they have suitable hue and density. Besides, they can be used alone or in combination. The content of the above anionic dye is preferably in a range of 0.2 to 15%, more preferably, 0.5 to 10% by weight based on the total ink weight. Namely, the anionic dye content in the above range enhances the reliability as the ink-jet ink, such as good coloring and ink discharge stability.

The anionic color ink used in the present invention contains at least one type of anionic substance in addition to the above anionic dye. Most of already present, or newly synthesized anionic substances can be used so long as they are anionic, but those having carboxyl group or sulfo group are preferable. One example of anionic substances having a carboxyl group or a sulfo group usable in the present invention is an organic acid salt, more specifically, anionic surfactant such as sodium alkylsulfate, sodium alkylsulfate, sodium dialkylsulfosuccinate, sodium alkylnaphthlenesulfonate, sodium alkyldiphenylether disulfonate, sodium alkylltaurine, sodium laurylsulfoacetate and sodium sulfosuccinate dialkyl ester; aromatic compounds having sulfo groups such as sodium benzenesulfonate, sodium benzenedisulfonate, sodium naphthalenesulfonate, sodium naphthalenedisulfonate and sodium naphthalenetrisulfonate; and carboxyl-group contained such as sodium benzoate and ammonium benzoate are referred to, but not limited to.

The content of the above anionic substance in the color ink is preferably in the range of 0.2 to 10% by weight, more preferably 0.5 to 8% by weight based on the total color ink weight. In other words, the content of the anionic substance in the above range achieves desired aggregation effect and ensures the reliability as the ink-jet ink.

Further, it is preferable for the color ink used in the invention to contain a surfactant to have a fast penetrability into so-called plain paper. As examples of the surfactant, anionic surfactant as described above, nonionic surfactant such as higher alcohol ethylene oxide adducts, alkylphenol ethylene oxide adducts, aliphatic ethylene oxide adducts, polyvalent alcohol fatty acid ester ethylene oxide adducts, fatty acid amide ethylene oxide adducts, higher alkylamine ethylene oxide adducts, polypropylene glycol ethylene oxide adducts, fatty acid polyvalent alcohol esters and fatty amides of alcanol amines; and amphoteric surfactant of amino acid type or betaine type are referred to. Two or more of these surfactant can be selected and used as a mixture.

The content of the above anionic surfactant in the color ink is not limited but preferably in the range of 0.01 to 10% by weight based on the total color ink weight. In other words, the content of the anionic surfactant in the above range achieves desired penetration effect and ensures the reliability as the ink-jet ink.

Besides, for a rapid penetrability, it is effective for the color ink to contain an ether of polyvalent alcohol, for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, propylene glycol monobutyl ether and dipropylene glycol monobutyl ether. Furthermore, if the penetrability is not enough, a strongly penetrable water-soluble organic solvent such as hexylene glycol and dipropylene glycol can be added to enhance the penetrability into the recording medium such as plain paper.

In preparation of a color ink of above constitution, it is preferable to use water or a mixture of water and a water-soluble organic solvent as a liquid medium to disperse or dissolve the above anionic dye and anionic substance. Specifically preferable water-soluble organic solvents are those that can prevent drying of the ink. Specific examples include $C_1$–$C_4$ alkyl alcohols such as methyl alcohol, ethyl alcohol, n-propyl alcohol, iso-propyl alcohol, n-butyl alcohol, sec-butyl alcohol, and tert-butyl alcohol; amides such as dimethyl formaldehyde and dimethyl acetamide; ketones or ketoalcohols such as acetone and diacetone alcohol; ethers such as tetrahydrofurane and dioxane; polyalkylene glycols such as polyethylene glycol and polypropylene glycol; alkylene glycols with a $C_2$–$C_6$-alkylene group such as ethylene glycol, propylene glycol, butylene glycol, triethylene glycol, 1,2,6-hexane triol, thiodiglycol; hexylene glycol and diethylene glycol; lower alkyl ether acetates such as polyethylene glycol monomethyl ether acetate; glycerol; lower alkyl ethers of polyhydric alcohols such as ethylene glycol monomethyl- (or monoethyl-)ether, diethylene glycol methyl- (or ethyl-) ether and triethylene glycol monomethyl- (or monoethyl-)ether; polyhydric alcohols such as trimethylol propane and trimethylol ethane; N-methyl-2-pyrrolidone, 2-pyrrolidone and 1,3-dimethyl-2-imidazolidinone. Such water-soluble organic solvents may be used singly or as a mixture.

The content of the water-soluble organic solvent contained in the ink of the invention is not specifically limited, but preferably in the range of 3 to 50% by weight based on the total ink weight. The water content in the ink is preferably in the range of 50 to 95% by weight based on the total ink weight. It is desirable to use deionized water.

The color ink of the above constitution according to the present invention can be used for ink-jet recording as well as for hand-writing tools. As ink-jet recording methods, there are a recording method in which a mechanical energy is applied to the ink to eject an ink droplet and a recording method in which a thermal energy is applied to the ink to eject an ink droplet by the action of a bubble in the ink, for both of which the ink according to the present invention is especially suitable. When the ink set according to the aspect of the present invention is used for ink-jet recording, the ink should have suitable properties for discharge from an ink-jet head. From this point of view, the ink has liquid properties such as the viscosity of 1 to 15 cps, and the surface tension of preferably 25 mN/m (dyne/cm) or more, more preferably, 1 to 5 cP and 25 to 50 mN/m.

To provide the color ink with such properties, the aqueous medium preferably contains glycerol, trimethylolpropane, thioglycol, ethylene glycol, diethylene glycol, isopropyl alcohol, acetylene alcohol, and the like. As the acetylene alcohol, an acetylene alcohol of following formula can be used.

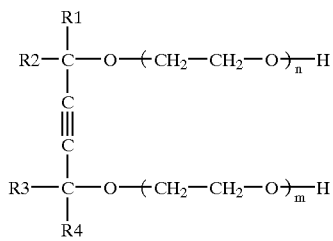

where R1, R2, R3 and R4 denote alkyl group and specifically, C1 to C4 straight or branched alkyl group, m and n denote 0 or an integer, provided that $0 \leq m+n \leq 30$.

In addition to these constituents, if necessary, the color ink in the ink set of the invention may further contain following additives to have desired performance; nitrogen-contained compounds as a humectant such as urea, thiourea, ethylene urea, alkyl urea, alkyl thiourea, dialkyl urea and dialkyl thiourea: pH controlling agent; viscosity controlling agents; preservatives; antioxidants, evaporation accelerators, rust inhibitors, antimolds and cheleting agents.

The above explained ink set of the present invention which comprises of black and color ink is suitably used in the ink-jet recording method, in which an ink droplet is discharged from the ejection orifice according to the recording signal to make record on the recording medium, especially in the ink-jet recording system utilizing thermal energy the for ink droplet discharge. As a recording method for using an ink set according to the present invention to appropriately perform the recording, the ink-jet recording method of giving the thermal energy corresponding to a recording signal to the ink of individual colors stored in the recording head to generate a liquid droplet by the relevant thermal energy is referred to. One example of the ink-jet recording apparatus according to the present invention will be described below to which such an ink-jet recording method is applied.

Figure 2:
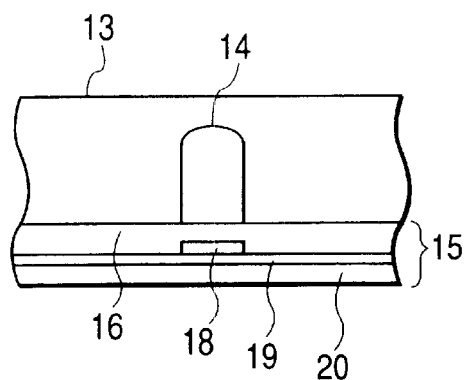
FIG. 2 is a vertical sectional view of an ink-jet recording apparatus head.
Figure 3:
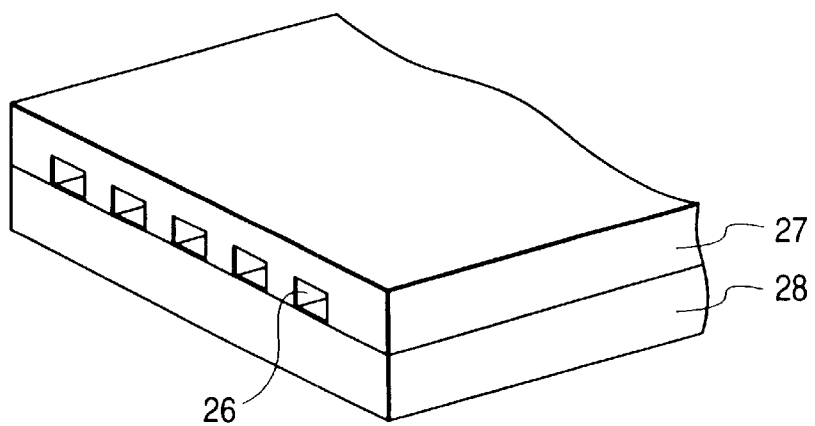
FIG. 3 is a perspective appearance view of a head multiplexed from the head shown in FIG. 1.

First, a configuration example of the main part, head, of this apparatus is shown in FIGS. 1, 2 and 3. FIG. 1 is a sectional view of a head 13 along the ink flow path and FIG. 2 is a sectional view taken on line 2—2 of FIG. 1. The head 13 is obtained by adhesion of a heat generating head 15 used for the thermosensitive recording (in FIG. 1, a film head is shown, but the present invention is not limited to this) to a glass, ceramic or plastic plate having a groove 14 through which ink flows. The heat generating head 15 comprises a protective film 16 formed of silicon oxide or the like, aluminum electrodes 17-1 and 17-2, a heat generating resistance layer 18 formed of Nichrome, a heat accumulating layer 19 and a highly heat-radiating substrate 20 made of alumina or the like.

The ink 21 comes to a discharge orifice (fine hole) 22 and forms a meniscus 23 under the pressure P. Now, when an electric signal information item is applied to the aluminum electrodes 17-1 and 17-2, the region designated with n of the heat generating head 15 is rapidly heated, a bubble is generated in the ink 21 contacting here, the meniscus 23 protrudes under this pressure and the ink 21 is ejected to make an ink droplet 24 and fly to a recording medium 25 from the discharge orifice 22.

FIG. 3 shows an appearance view of a multihead comprised of an array of many heads shown in FIG. 1. The relevant multihead is fabricated by a close adhesion of a heat generating head 28 similar to that described in FIG. 1 to a glass plate 27 having a multi-groove 26.

Figure 4:
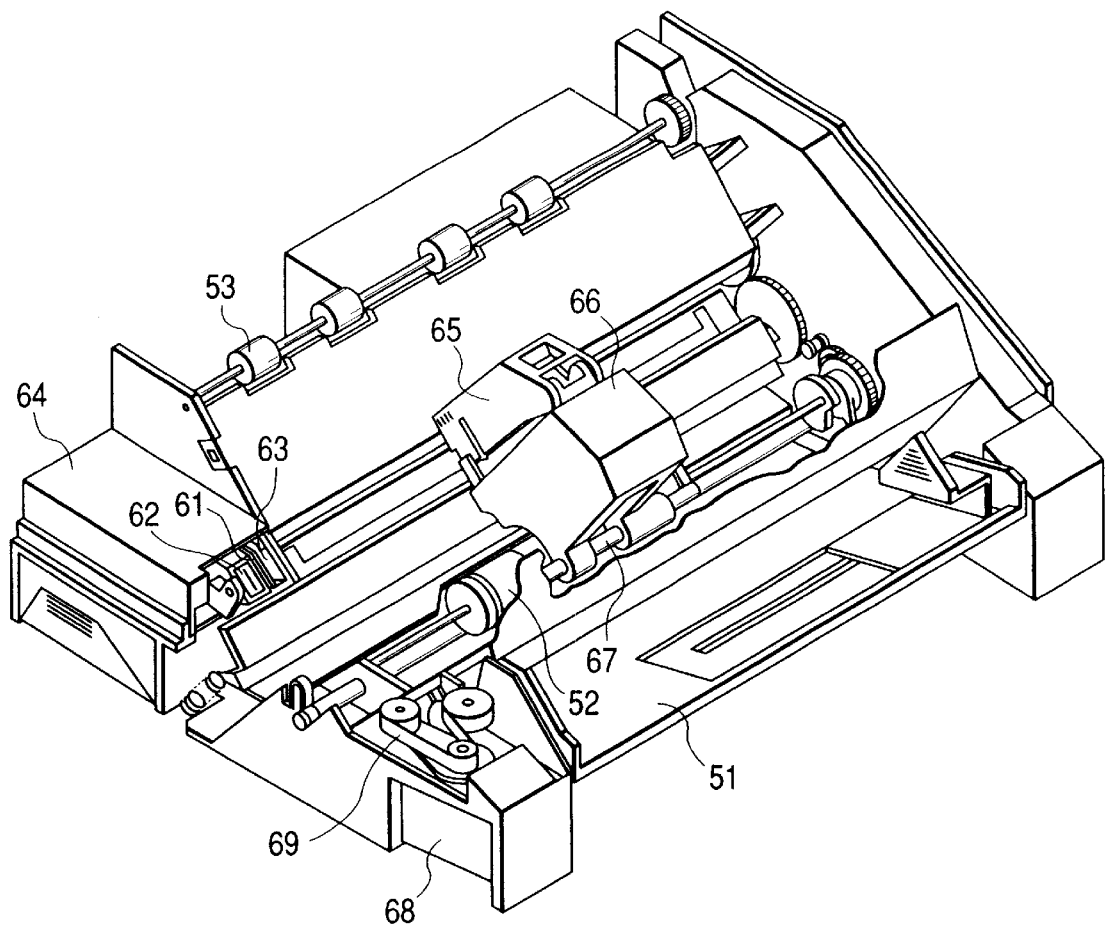
FIG. 4 is a perspective view of one example of ink-jet recording apparatus.

FIG. 4 shows one example of ink-jet recording apparatus with the above head incorporated. In FIG. 4, numeral 61 denotes a blade serving as the wiping member, one end of which is retained by a blade retaining member to make a stationary end, thereby shaping a cantilever as a whole. The blade 61 is disposed at a position adjacent to the recording area by the recording head 65 and is retained in the shape of protruding into the moving route of the recording head 65 in case of this example. Numeral 62 denotes a cap on the ejection orifice surface of the recording head 65, which is located at the home position adjacent to the blade 61 and so arranged as to move in a direction perpendicular to the movement of the recording head 65, to butt against the ink ejection orifice and to fulfill the capping. Furthermore, Numeral 63 denotes an ink absorber provided adjacently to the blade 61, which is retained in the shape of protruding into the moving route of the recording head 65 as with the blade 61.

A discharge recovering section 64 comprises the above blade 61, the above cap 62 and the above ink absorber 63 and the moisture, dust and the like on the ink ejection orifice are removed by the blade 61 and the ink absorber 63. Numerals 65 and 66 denotes a recording head equipped with discharge energy generating means which discharges ink to the recording medium opposed to the ejection orifice face from a ejection orifice disposed to perform recording and an carriage for loading and moving the recording head 65, respectively. The carriage 66 is slidably engaged with a guide shaft 67 and part of the carriage 66 is connected (unillustrated) to the belt 69 driven by a motor 68. Thereby, the carriage 66 is enabled to move along the guide shaft 67, thus enabling the recording area by the recording head 65 and its adjacent areas to move.

Numerals 51 and 52 denote a paper feed section for inserting a recording medium and a paper feed roller driven by an unillustrated motor, respectively. By these constituents, the recording medium is fed to the position opposed to the ejection orifice face of the recording head 65 and paper is discharged to the paper discharge section disposed with the paper discharge roller 53 according to the progress of recording.

In a return of the recording head 65 to the home position at the end of recording or the like with the above configuration, the cap 62 of the discharge recovering section 64 is averted from the moving route of the recording head 65, whereas the blade 61 protrudes into the moving route. As a result, the ejection orifice face of the recording head 65 is wiped. When the cap 62 caps the ejection orifice face of the recording head 65 by butting, the cap 62 moves in such a manner as to protrude into the moving route of the recording head.

When the recording head 65 moves from the home position to the recording start position, the cap 62 and the blade 61 stand at the same position as that of the above wiping. As a result, the ejection orifice face of the recording head 65 is wiped also in this move. The above move of the recording head 65 to the home position is not only performed at the completion of recording and at the recovery of discharge, but also the recording head 65 moves at given intervals to the home position adjacent to the recording area while moving through the recording area for recording and the above wiping is carried out with this move.

Figure 5:
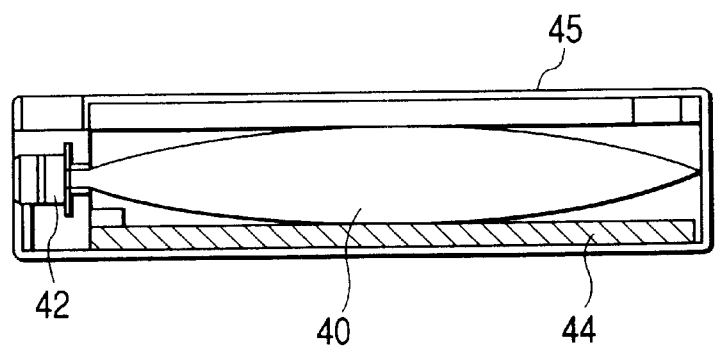
FIG. 5 is a vertical sectional view of an ink cartridge.

FIG. 5 shows one example of an ink supply member for the head, an ink cartridge 45 for storing the ink supplied via a tube. Here, numeral 40 denotes an ink storing section for storing the supply ink, e.g. an ink bag, at the tip of which a rubber stopper 42 is provided. By inserting a needle (unillustrated) into this stopper 42, the ink in the ink sack 40 is enabled to be supplied to the head. Numeral 44 denotes an ink absorber for receiving the waste ink. As the ink store section, it is preferable for the present invention that the liquid contact surface with ink is made of polyolefin, especially polyethylene.

Figure 6:
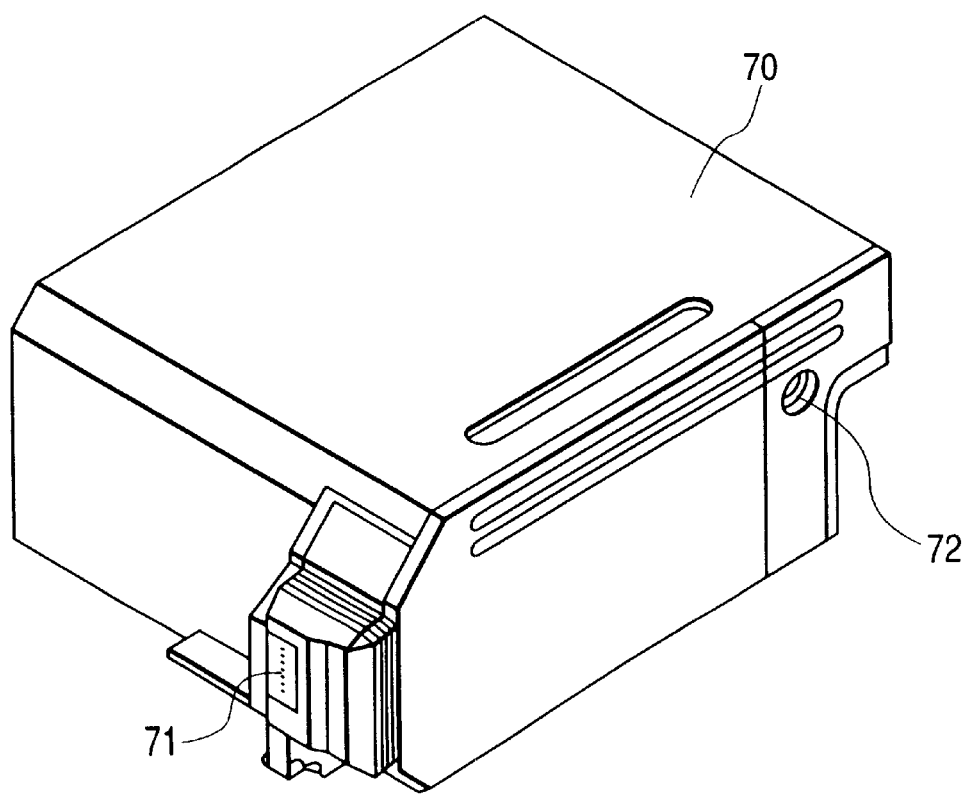
FIG. 6 is a perspective view showing one example of recording unit.

An ink-jet recording apparatus according to the present invention is not limited to those comprising a head and an ink cartridge separately as mentioned above, but is also appropriately applied to integrated one as shown in FIG. 6. In FIG. 6, numeral 70 denotes a recording unit in which an ink store section for storing ink, e.g. an ink absorber is accommodated and the ink in such an ink absorber is discharged as an ink droplet from the head section 71 having a plurality of orifices.

As materials of an ink absorber, polyurethane, cellulose, polyvinyl acetate or polyolefin type resin is preferably used. Numeral 72 denotes an atmosphere communicative port for communicating the recording unit interior to the atmosphere. This recording unit 70 is used in place of the recording head 65 shown in FIG. 4 and is freely mountable and demountable.

At the left end of a movable region of the carriage, a discharge recovery system unit 110 is present at the bottom and caps the ejection orifice section of a recording head at the time of non-recording. This left end is referred to as home position of a recording head. Numeral 107 denotes both a switch section and a display element section. The former is used for ON/OFF of the power supply of a recording apparatus, at the setting of various recording methods or the like, while the latter plays a part of displaying the condition of a recording apparatus.

Figure 7:
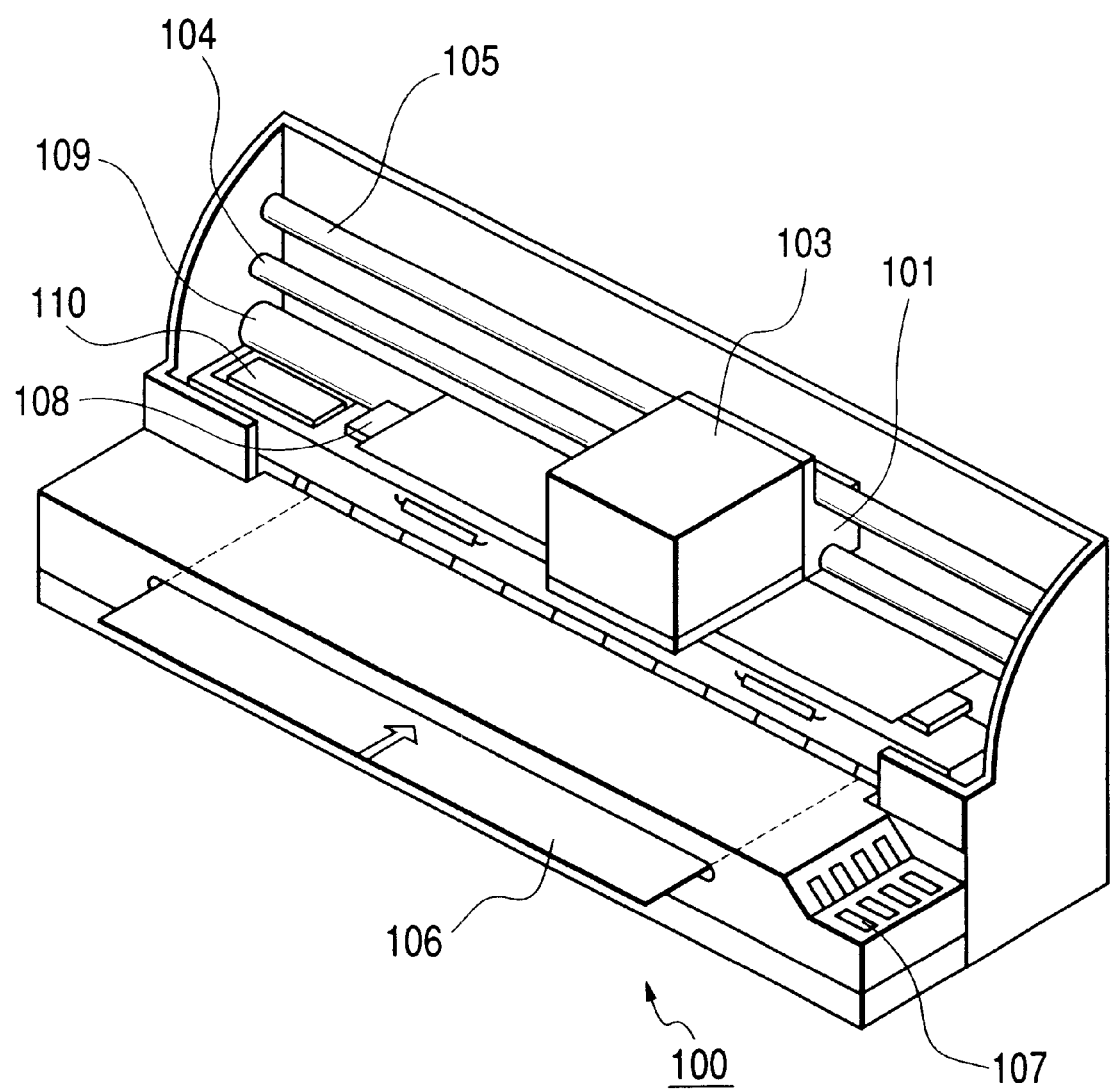
FIG. 7 is a perspective view of an ink-jet recording apparatus.

FIG. 7 is a perspective view of an ink-jet recording apparatus applicable to the present invention. The recording medium 106 inserted in the paper feed position of a recording apparatus 100 is conveyed to the recordable area of the recording head unit 103 by the feed roller 109. Below the recording medium in the recordable area, a platen 108 is provided. The carriage 101 is so arranged as movable in the direction determined by two guide shafts of a guide shaft 104 and a guide shaft 105 and scans the recording area reciprocally. On the carriage 101, a recording head unit 103 including multiple recording heads for discharging individual color ink and ink tanks for supplying ink to respective recording heads is loaded.

Multiple color inks provided in this example of ink-jet recording apparatus are black (Bk), cyan (C), magenta (M) and yellow (Y) inks.

Figure 8:
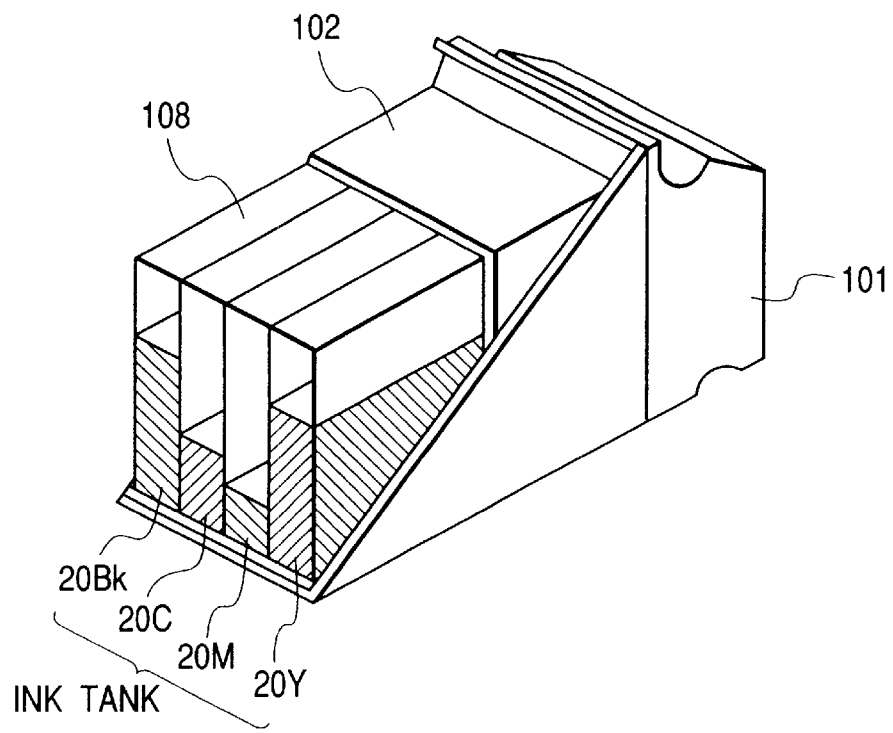
FIG. 8 is a perspective view showing the recording head unit in FIG. 7.

FIG. 8 is a perspective view showing the recording head unit of FIG. 7.

On the carriage 101, a recording head 102 for discharging individual color ink of Bk, C, M and Y, a Bk ink tank 20Bk, a C ink tank 20C, a M ink tank 20M and a Y ink tank 20Y are loaded. Each tank is connected to the recording head via the connecting section with the recording head and is supplied to the respective ejection orifice.

Other than this example, tanks for individual color ink comprising C, M and Y may be integrally structured.

Figure 9:
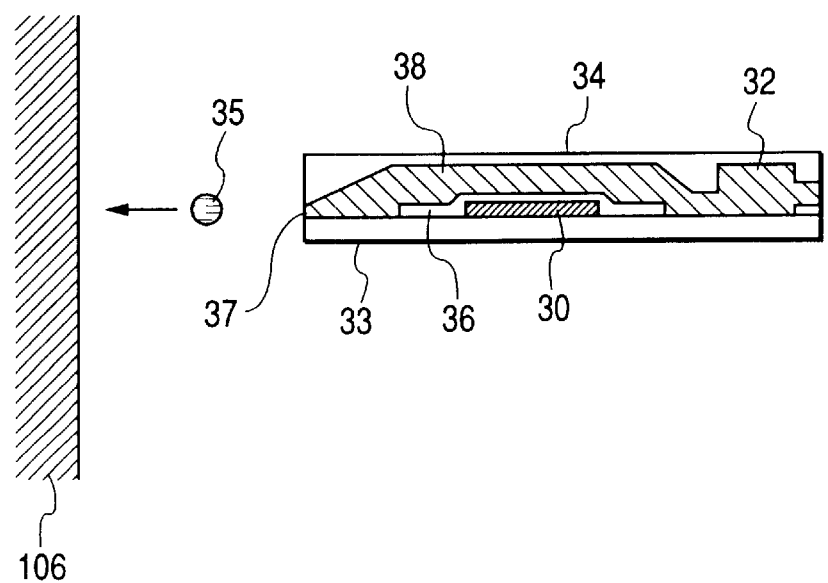
FIG. 9 is an enlarged sectional view of the neighborhood of the heat generating element of a recording unit.

FIG. 9 is an enlarged sectional view of the vicinity of the heat generating body of a recording head. An ink-jet recording apparatus according to this example adopts a recording method for discharging ink from each nozzle by disposing a heat generating member made of a electrothermal converting element to each ink ejection orifice and by applying driving signals corresponding to the recording information to the heat generating member. Heat generating member 30 is so arranged as able to independently heat each nozzle.

The ink in a nozzle rapidly heated by the heat generation of a heat generating body 30 forms a bubble through the film boiling, an ink droplet 35 is discharged toward a recording medium 106 under pressure of this bubble generation as shown in FIG. 9 to form a character or an image on the recording medium. At individual ejection orifices 37, ink flow paths 38 communicating with the respective ejection orifices are provided and a common liquid chamber 32 for supplying ink to these ink paths is provided behind the location of ink liquid paths 38. In each ink flow path corresponding to each ejection orifice, there is provided the heat generating member 30 made of an electrothermal converting element to generate thermal energy for discharging an ink droplet from the ejection orifice, with electrode wiring for supplying electric power to it. These heat generating members 30 and electrode wiring are formed on the substrate 33 made of silicon or the like by the film forming technique. On each heat generating member 30, a protective film 36 is formed so that ink is not brought into contact with the heat generating member. Furthermore, by stacking a barrier 34 made of a resin or glass material on this substrate, the ejection orifices, the ink liquid paths, the common liquid chamber mentioned above or the like are configured.

As mentioned above, the recording system using a heat generating member being an electrothermal converting element is commonly referred to as the bubble jet recording system, since it utilizes a bubble formed by application of thermal energy for discharging an ink droplet. In the above description, the invention is explained referring to an ink-jet recording apparatus of bubble-jet system, but ink-jet recording apparatuses of other ink-jet systems such as the piezoelectric system using piezoelectric elements may be employed.

Figure 10:
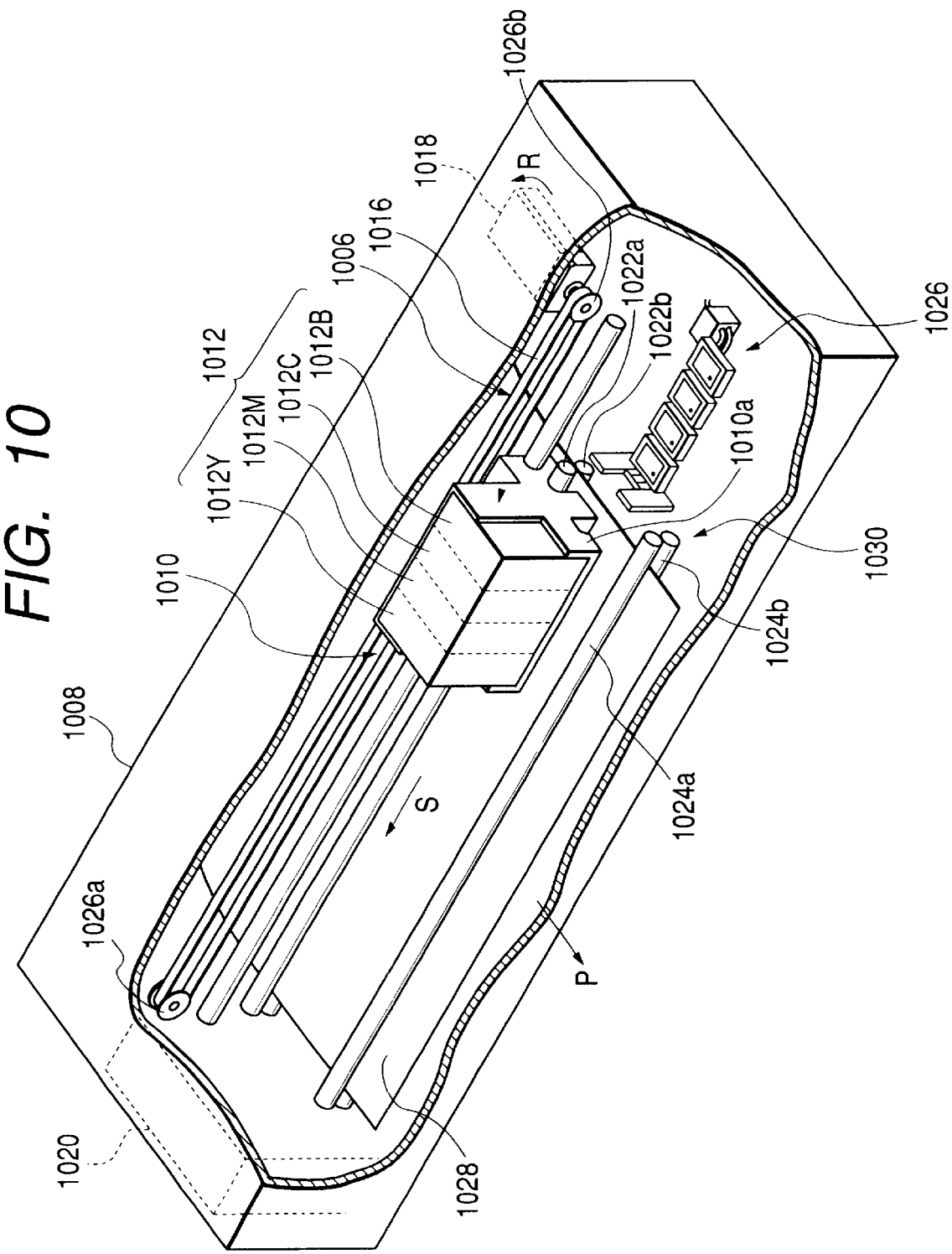
FIG. 10 is a schematic perspective view showing the principal portion of one example of ink-jet printer, on which a liquid ejection head is loadable.

Next, another particular example of a recording apparatus and a recording head that can suitably be used in the present invention will be described. FIG. 10 schematically shows the main section of one example of a liquid ejection head as an ejection type liquid ejection head in which the bubble communicates with the atmosphere at the time of discharge and an ink jet printer as a liquid discharge apparatus using this head according to the present invention.

In FIG. 10, the ink jet printer is configured to comprise a feeder device 1030 that intermittently feeds a sheet of paper 1028 as a recording medium provided along the longitudinal direction in a casing 1008 in the direction shown by arrow P shown in FIG. 10, a recording section 1010 that is reciprocated approximately in parallel to the direction S approximately at right angles to the feeding direction P of the paper 1028 by the feeder device 1030, and a movement driving section 1006 as driving means for reciprocating the recording section 1010.

The movement driving section 1006 is configured to comprise a belt 1016 that is wound on pulleys 1026a, 1026b provided on rotary shafts oppositely arranged with a predetermined interval, and a motor 1018 that drives the belt 1016 arranged approximately in parallel to roller units 1022a, 1022b and connected to a carriage member 1010a of the recording section 1010 in the forward direction and reverse direction.

When the motor 1018 is brought in the operating state and the belt 1016 is rotated in the direction shown by arrow R in FIG. 10, the carriage member 1010a of the recording section 1010 is moved in the direction shown by arrow S in FIG. 10 only by a predetermined movement. Furthermore, when the motor 1018 is brought in the operating state and the belt 1016 is rotated in the direction opposite to the direction shown by arrow R in FIG. 10, the carriage member 1010a of the recording section 1010 is moved in the direction opposite to the direction shown by arrow S in FIG. 10 only by a predetermined movement. Furthermore, to one end of the movement driving section 1006, at a position which is a home position of the carriage member 1010a, a recovery unit 1026 for performing the ejection recovery process of the recording section 1010 is provided opposite to the arrangement of the ink ejection orifice of the recording section 1010.

In the recording section 1010, ink jet cartridges (hereafter, in some cases, referred to simply as cartridges) 1012Y, 1012M, 1012C, 1012 B are detachably provided to the carriage member 1010a for each color, for example, for each of yellow, magenta, cyanogen, and black.

Figure 11:
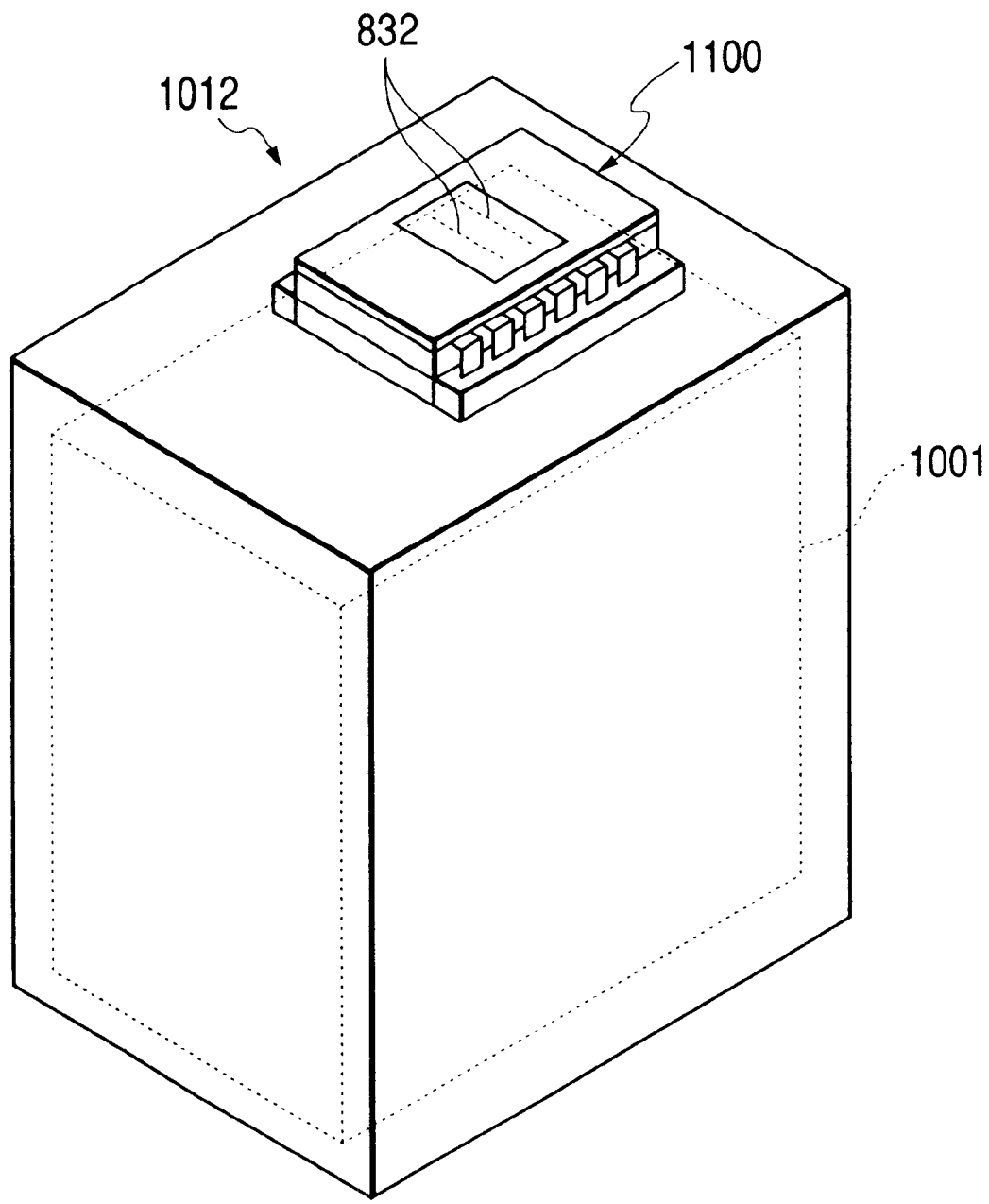
FIG. 11 is a schematic perspective view showing one example of ink-jet cartridge equipped with a liquid ejection head.

FIG. 11 shows one example of an ink jet cartridge that can be mounted on the above described ink jet recording apparatus. The cartridge 1012 in this example is a serial type cartridge, and the main section consists of an ink jet recording head 1100 and a liquid tank 1001 for containing liquid such as ink.

In the ink jet recording head 1100, a number of ejection orifices 832 for discharging the liquid are formed, and the liquid such as ink is arranged to be introduced to a common liquid chamber (see FIG. 12) of the liquid ejection head 1100 through a liquid supply path not shown from a liquid tank 1001. The cartridge 1012 is a cartridge in which the ink jet recording head 1100 and the liquid tank 1001 are integrally formed so that liquid may be supplied into the liquid tank 1001 if necessary, but it is also possible to adopt a structure where the liquid tank 1001 is exchangeably connected to this liquid ejection head 1100.

A particular example of the above described liquid ejection head that can be mounted on an ink jet printer with such a configuration will be described below in more detail.

Figure 12:
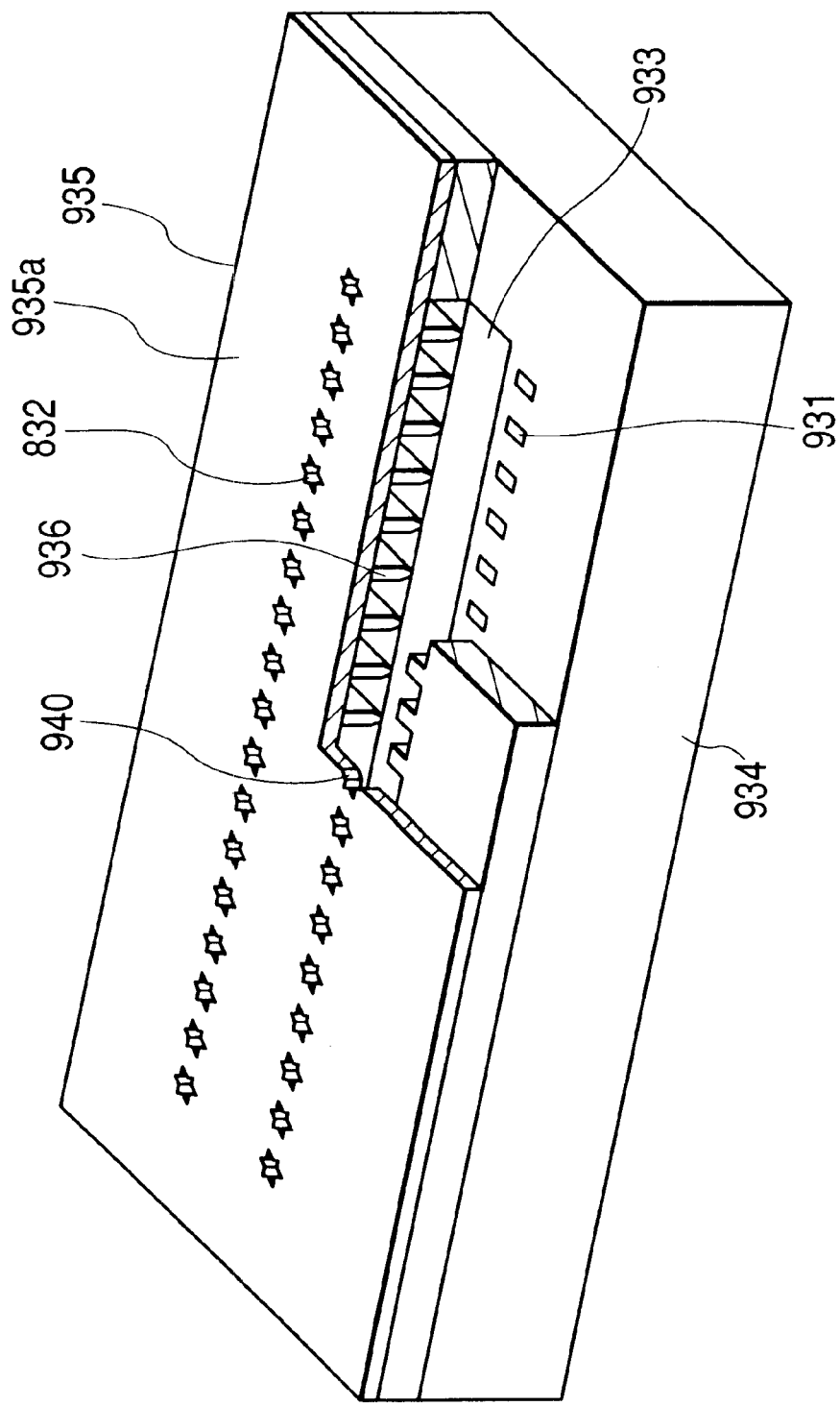
FIG. 12 is a schematic perspective view showing the principal portion of one example of liquid ejection head.

FIG. 12 is a perspective view schematically showing the main section of a liquid ejection head showing the basic form of the present invention, and FIG. 13 to FIG. 16 are front views showing the shape of the ejection orifice of a liquid ejection head shown in FIG. 12. Herein, the electrical wiring or the like for driving the electrothermal converting element is omitted.

In the liquid ejection head of this example, for example, as shown in FIG. 12, a substrate 934 made of glass, ceramics, plastic, or metal or the like is used. The material of such a substrate is not important for the present invention, and it is not specifically limited as long as it can function as part of the flow path component and it can function as a support member of the material layer forming the ink ejection energy generating element, and the liquid flow path and ejection orifice to be described later. Accordingly, in this example, a case where an Si substrate (wafer) is used will be described. Besides a forming method by using laser beams, the ejection orifice can also be formed by a method in which for example, an orifice plate (ejection orifice plate) 935 to be described later is made of photosensitive plastics so that an exposure device such as MPA (Mirror Projection Aliner) may be used.

In FIG. 12, reference numeral 934 denotes a substrate having an electrothermal converting element (hereafter, in some cases, referred to as a heater) 931 and an ink supply port 933 made of an elongated groove-shaped through hole as a common liquid chamber section, and on both sides in the longitudinal direction of the ink supply port 933, one line of heaters 931 that are thermal energy generating means are arranged in a staggered arrangement, for example, at intervals of 300 dpi between the electrothermal converting elements, respectively. On this substrate 934, ink flow path walls 936 for forming ink flow paths are provided. Furthermore, to these ink flow path walls 936, an ejection orifice plate 935 having ejection orifices 832 is provided.

Here, in FIG. 12, the ink flow path wall 936 and the ejection orifice plate 935 are shown as separate members, but it is also possible to simultaneously form the ink flow path wall 936 and the ejection orifice plate 935 as one member by forming this ink flow path wall 936 on the substrate 934 by a method such as the spin coating. In this example, furthermore, the water repellency treatment is performed on the ejection orifice surface (upper surface) 935a side.

In this example, a serial type head that performs recording while scanning in the direction shown by arrow S in FIG. 10 is used, and the recording is performed, for example, by 1200 dpi. The driving frequency is 10 kHz, and at one ejection orifice, the discharge is performed at the shortest time intervals of 100 μs.

Figure 13:
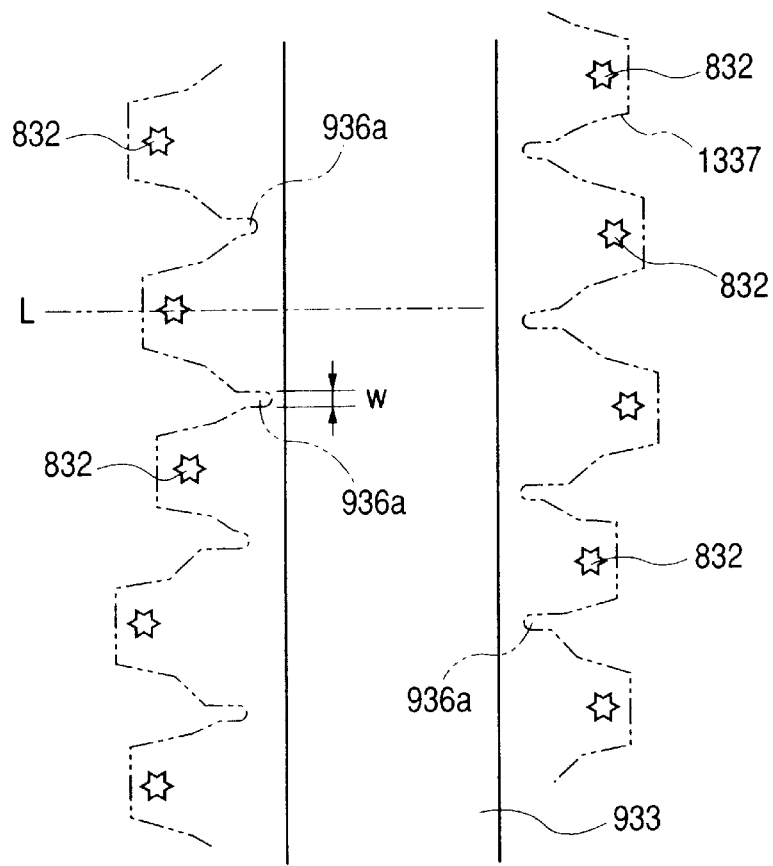
FIG. 13 is a conceptual drawing partially extracted from one example of liquid ejection head.
Figure 16:
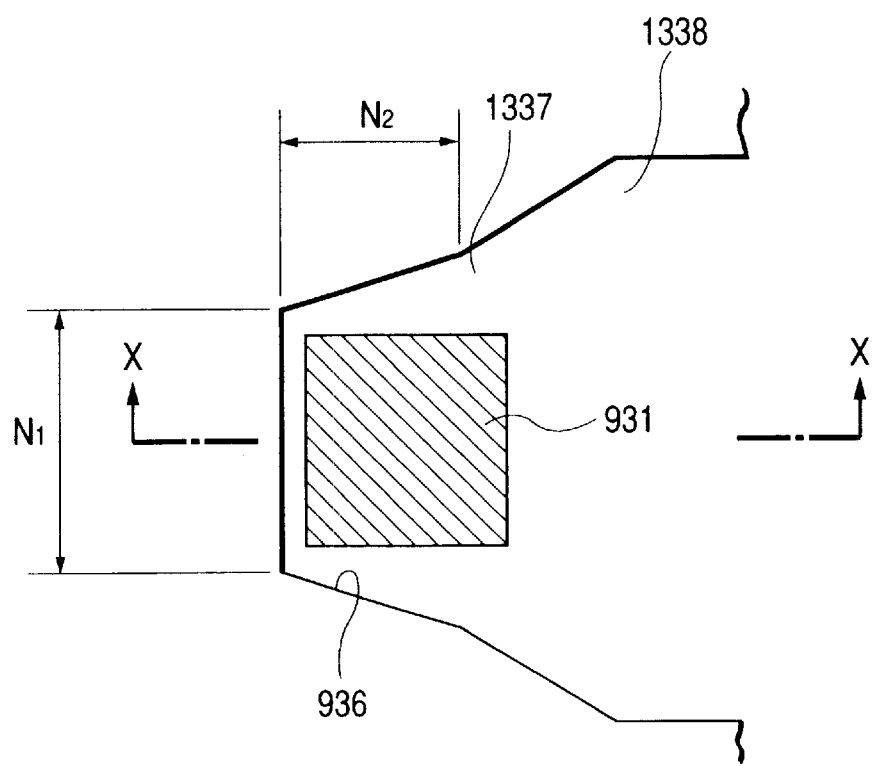
FIG. 16 is a schematic drawing of a principal portion in FIG. 13.

Furthermore, as one example of actual size of the head, for example, as shown in FIG. 13, a partition wall 936a that hydraulically separates adjacent nozzles has a width W of 14 μm. As shown in FIG. 16, a bubbling chamber 1337 formed by the ink flow path wall 936 has $N_1$ (width size of a bubbling chamber) of 33 μm and $N_2$ (length size of a bubbling chamber) of 35 μm. The size of a heater 931 is 30 μm×30 μm, and the resistance of a heater is 53 Ω, and the driving voltage is 10.3 V. Furthermore, the height of an ink flow path wall 936 and a partition wall 936a is 12 μm, and an ejection orifice plate with a thickness of 11 μm can be used.

Among the cross sections of the ejection orifice section 940 provided in the ejection orifice plate including the ejection orifice 832, the cross section taken in the direction crossing the discharge direction of the ink (thickness direction of the orifice plate 935) is shaped roughly like a star, and it is roughly configured by six rising sections 832a having an obtuse angle and six recessed sections 832b arranged alternately between these rising sections 832a and having an acute angle. That is, direction of the orifice plate (discharge direction of the liquid) shown in FIG. 12 with the recessed section 832b as an area locally separated from the center O of the ejection orifice being the top thereof and the rising section 832a as an area locally near the center O of the ejection orifice adjacent to this area being the base thereof six grooves are formed in the thickness. (As for the position of the groove section, see 1141a in FIG. 17)

In this example, the ejection orifice section 940 is made such that for example, the cross section fallen in the direction crossing the thickness direction thereof has a shape of two equilateral triangles with a side of 27 μm combined rotated by 60 degrees to each other, and $T_1$ shown in FIG. 13 is 8 μm. Every angle of the rising section 832a is 120 degrees, and every angle of the recessed section 832b is 60 degrees.

Accordingly, it is arranged that the center O of the ejection orifice agrees with the center G of gravity of a polygon formed by connecting central sections (centers (centers of gravity) of the figure formed by connecting the top of the groove and two bases adjacent to this top) of mutually adjacent grooves. The opening area of an ejection orifice 832 of this example is 400 μm², and the opening area of the groove section (area of a figure made by connecting the top of the groove and two bases adjacent to this top) is about 33 μm² per one.

Figure 14:
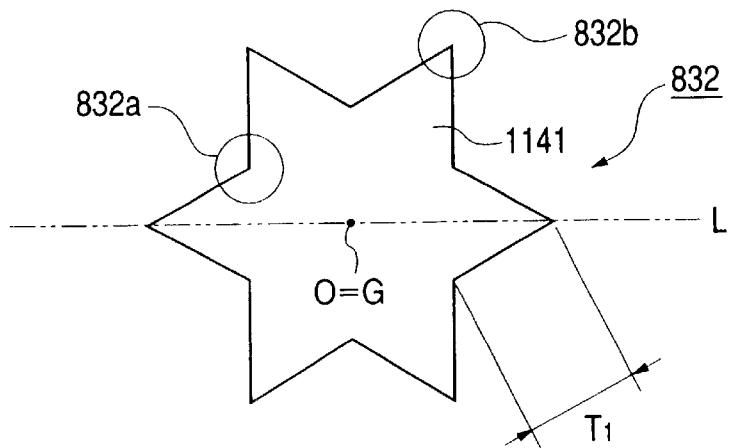
FIG. 14 is an enlarged view of the ejection orifice part shown in FIGS. 12 and 13.
Figure 15:
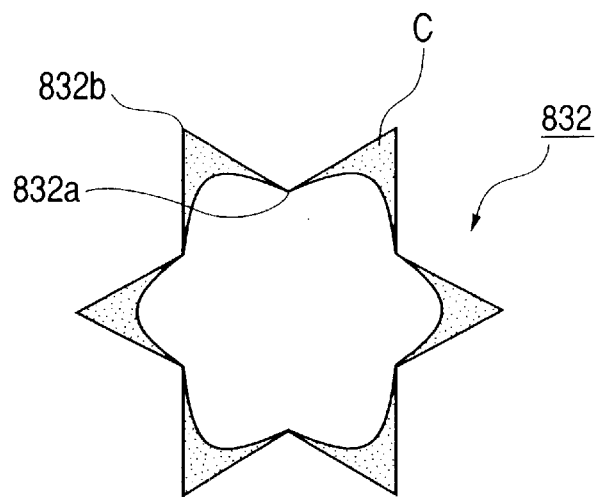
FIG. 15 is a schematic drawing showing the ink attachment condition in the ejection orifice part shown in FIG. 14.

FIG. 15 is a schematic view showing the state where ink is applied to the part of the ejection orifice shown in FIG. 14.

Next, the discharging action of liquid by an ink jet recording head with the above described configuration will be described by using FIG. 17 to FIG. 24.

FIG. 17 to FIG. 24 are cross sectional views for explaining the liquid discharging action of a liquid ejection head described in FIG. 12 to FIG. 16, and are cross sectional views taken along X—X of a bubbling chamber 1337 shown in FIG. 16. In this cross section, the end in the thickness direction of the orifice plate of the ejection orifice 940 is the top 1141a of the groove 1141.

Figure 17:
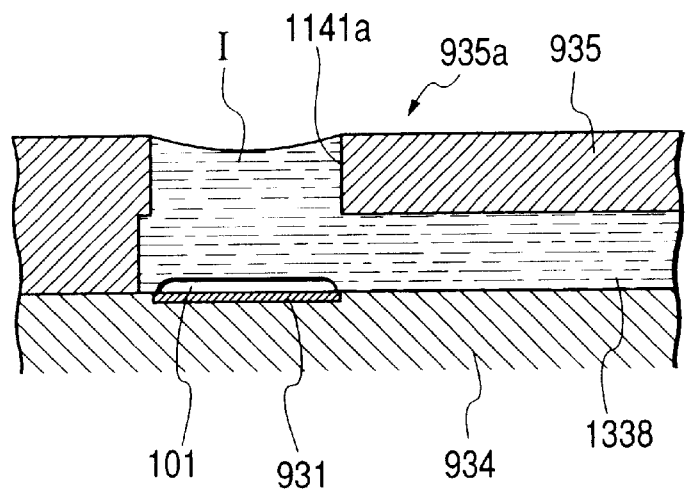
FIG. 17 is a schematic sectional view corresponding to an X—X perspective sectional shape in FIG. 16, for explaining a liquid discharging operation in a liquid ejection head with a lapse of time together with FIGS. 18 to 24.
Figure 18:
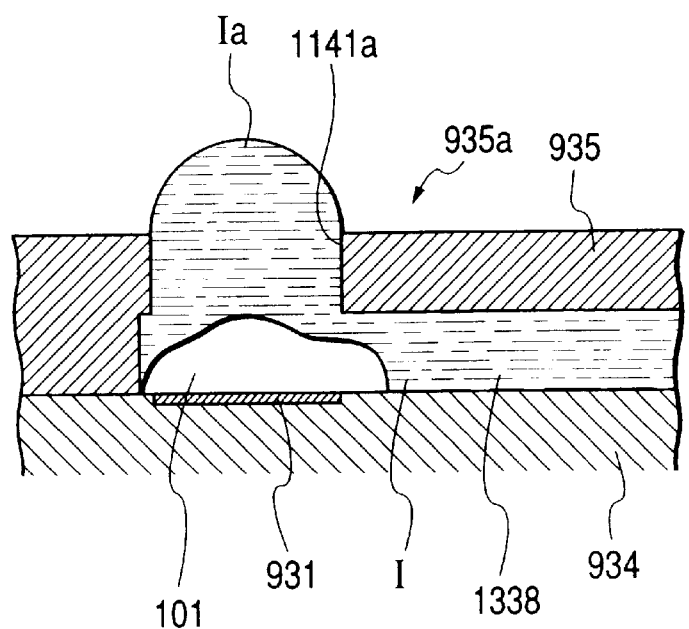
FIG. 18 is a schematic sectional view corresponding to an X—X perspective sectional shape in FIG. 16, for explaining a liquid discharging operation in a liquid ejection head with a lapse of time together with FIGS. 17, and 19 to 24.
Figure 19:
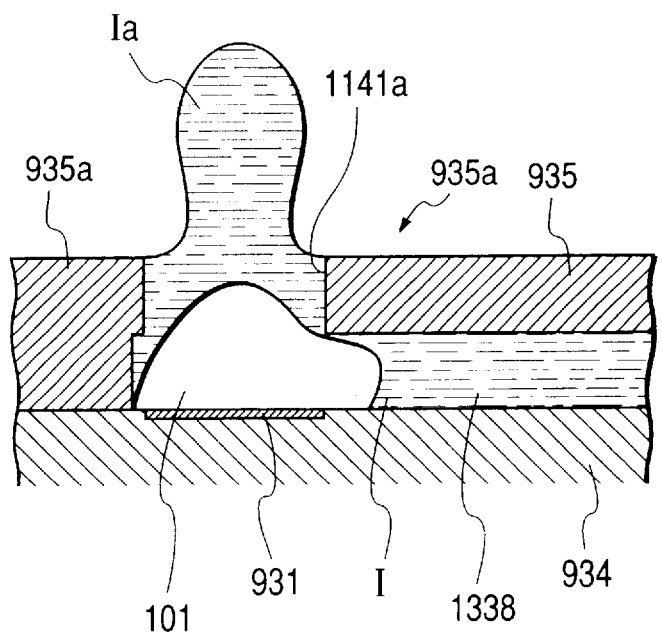
FIG. 19 is a schematic sectional view corresponding to an X—X perspective sectional shape in FIG. 16, for explaining a liquid discharging operation in a liquid ejection head with a lapse of time together with FIGS. 17, 18, 20 to 24.
Figure 20:
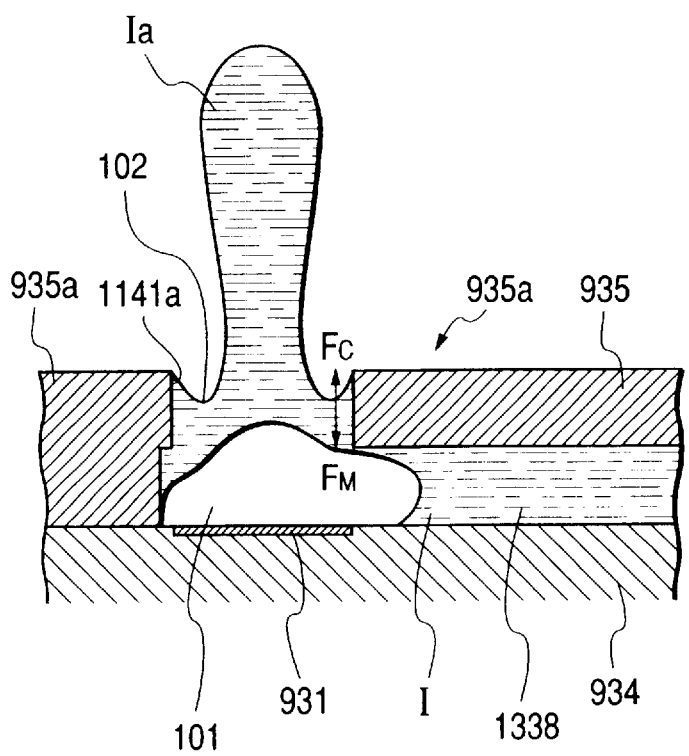
FIG. 20 is a schematic sectional view corresponding to an X—X perspective sectional shape in FIG. 16, for explaining a liquid discharging operation in a liquid ejection head with a lapse of time together with FIGS. 17 to 19, 21 to 24.
Figure 21:
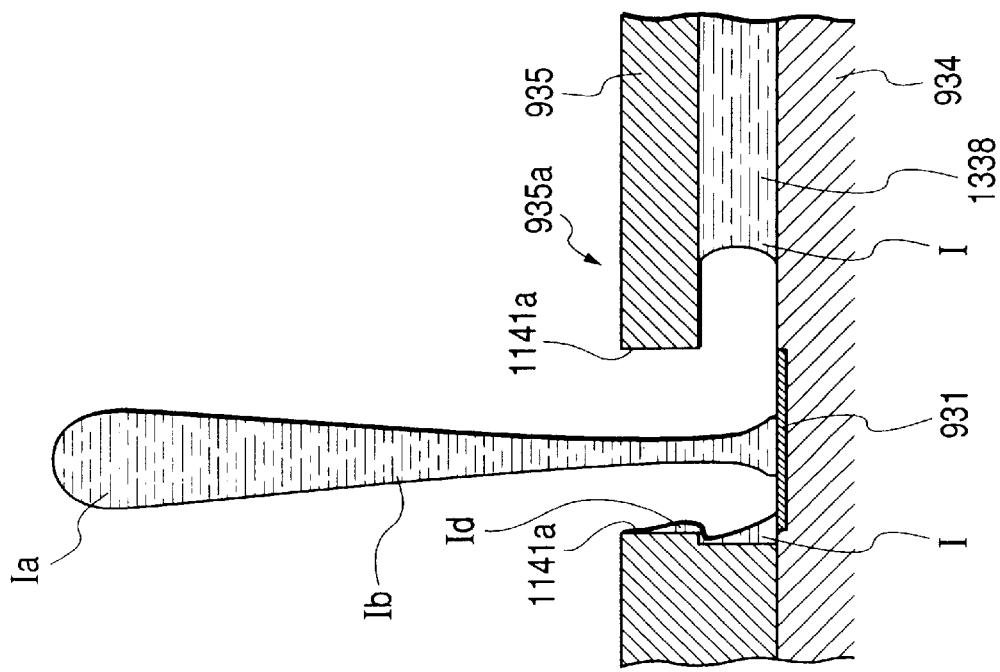
FIG. 21 is a schematic sectional view corresponding to an X—X perspective sectional shape in FIG. 16, for explaining a liquid discharging operation in a liquid ejection head with a lapse of time together with FIGS. 17 to 20, 22 to 24.
Figure 22:
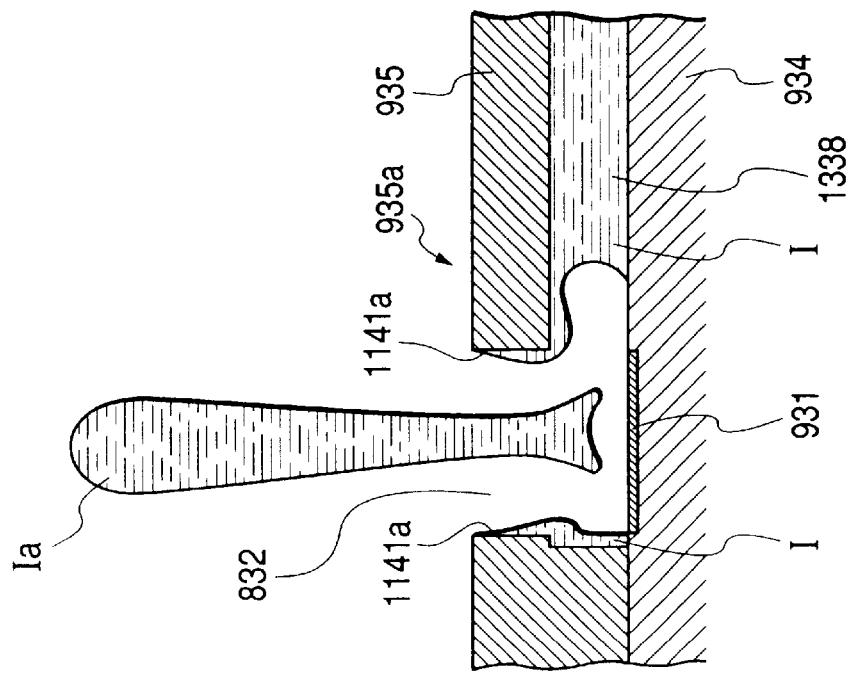
FIG. 22 is a schematic sectional view corresponding to an X—X perspective sectional shape in FIG. 16, for explaining a liquid discharging operation in a liquid ejection head with a lapse of time together with FIGS. 17 to 21, 23 and 24.
Figure 23:
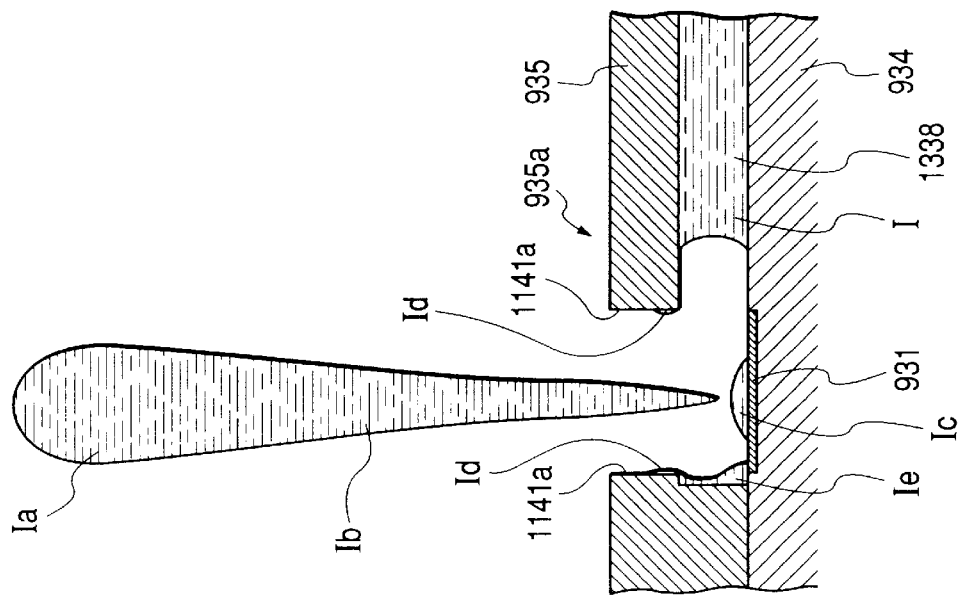
FIG. 23 is a schematic sectional view corresponding to an X—X perspective sectional shape in FIG. 16, for explaining a liquid discharging operation in a liquid ejection head with a lapse of time together with FIGS. 17 to 22, and 24.
Figure 24:
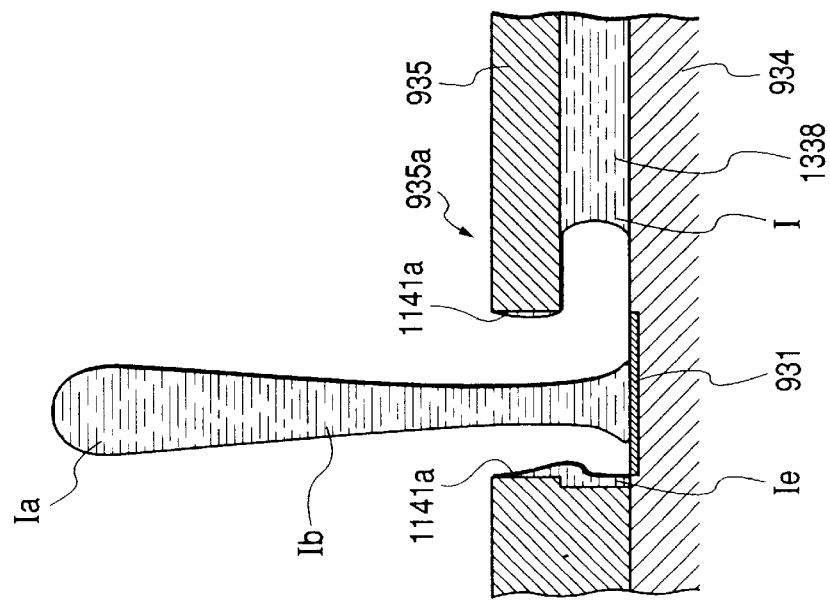
FIG. 24 is a schematic sectional view corresponding to an X—X perspective sectional shape in FIG. 16, for explaining a liquid discharging operation in a liquid ejection head with a lapse of time together with FIGS. 17 to 23.

FIG. 17 shows a state where a film-like bubble is formed on the heater, and FIG. 18 shows a state about 1 μs after the state of FIG. 17, and FIG. 19 shows a state about 2 μs after the state of FIG. 17, and FIG. 20 shows a state about 3 μs after the state of FIG. 17, and FIG. 21 shows a state about 4 μs after the state of FIG. 17, and FIG. 22 shows a state about 5 μs after the state of FIG. 17, and FIG. 23 shows a state about 6 μs after the state of FIG. 17, and FIG. 24 shows a state about 7 μs after the state of FIG. 17. Herein, in the following description, dropping does not mean the falling in the so-called direction toward gravity, but it means the movement in the direction toward an electrothermal converting element regardless of the attaching direction of a head.

First, as shown in FIG. 17, when a bubble 101 is formed in the liquid flow path 1338 on the heater 931 on supplying electric current to the heater 931 according to a recording signal or the like, the volume thereof is suddenly expanded within about 2 μs as shown in FIG. 18 and FIG. 19, so that the bubble may grow. The height of the bubble 101 at the time of the maximum volume exceeds the ejection orifice surface 935a, but at this moment, the pressure of a bubble is decreased to about one half to one-nineteenth of the atmospheric pressure.

Next, at the time about 2 μs after the formation of a bubble 101, the bubble 101 begins to decrease the volume from the maximum volume as mentioned above, and approximately simultaneously with this, the formation of a meniscus 102 also begins. This meniscus 102 also retreats in the direction on the heater 931 side, that is, falls as shown in FIG. 20.

Here, in this example, there are a plurality of grooves 1141 scattered at the ejection orifice section, and therefore, when the meniscus 102 retreats, the capillary force acts in the opposite direction $F_C$ of the meniscus retreating direction $F_M$ at the part of the groove 1141. As a result of that, even if a little scattering is recognized in the state of the bubble 101 because of any reason, the shapes of the meniscus when retreating and the main liquid droplet (hereafter, in some cases, referred to as liquid or ink) Ia are modified to be approximately symmetrical shapes with respect to the center of the ejection orifice.

Then, in this example, the falling speed of this meniscus 102 is faster than the contracting speed of the bubble 101, and therefore, as shown in FIG. 21, the bubble 101 communicates with the atmosphere at a place near the under surface of the ejection orifice 832 at the time about 4 µs after the formation of the bubble. At this moment, the liquid (ink) near the central axis of the ejection orifice 832 falls down toward the heater 931. This is caused since the liquid (ink) Ia drawn back to the heater 931 side by the negative pressure of the bubble 101 before communicating with the atmosphere keeps the speed in the direction of the surface of the heater 931 due to the inertia after the bubble 101 has communicated with the atmosphere.

The liquid (ink) that has fallen down toward the heater 931 side reaches the surface of the heater 931 at the time about 5 µs after the formation of the bubble 101 as shown in FIG. 22, and as shown in FIG. 23, it spreads to cover the surface of the heater 931. The liquid that has spread to cover the surface of the heater 931 in this way has a vector in the horizontal direction along the surface of the heater 931, and it crosses the surface of the heater 931. For example, the vector in the vertical direction vanishes, and it tends to stay on the surface of the heater 931, and it pulls down the liquid on the upper side thereof, that is, the liquid keeping the velocity vector in the discharge direction.

After that, the liquid part Ib between the liquid that has spread on the surface of the heater 931 and the liquid on the upper side (main liquid droplet) becomes thin, and as shown in FIG. 24, at the time about 7 µs after the formation of the bubble 101, the liquid part Ib is cut off at the center of the surface of the heater 931, and it is divided into the main liquid droplet Ia keeping the velocity vector in the discharge direction and the liquid Ic that has spread on the surface of the heater 931. Thus, the division preferably occurs in a position in the liquid flow path 1338, and it is more preferable to be positioned on the electrothermal converting element 931 side from the ejection orifice 832.

The main liquid droplet Ia is discharged from the central part of the ejection orifice 832 with no deviation in the discharge direction, and with no discharge twist, and it lands on a predetermined position of the recording surface of the recording medium. Furthermore, the liquid Ic that has spread on the surface of the heater 931 should become a satellite droplet as a follower of the main liquid droplet to fly in the prior art, but it stays on the surface of the heater 931, and it is not discharged.

Thus, the discharge of the satellite droplet can be inhibited, and therefore, the splash that is easily produced by the discharge of the satellite droplet can be prevented, and it is possible to surely prevent the staining of the recording surface of the recording medium because of the mist floating like fog. Herein, in FIG. 21 to FIG. 24, reference numeral Id denotes the ink adhered to the groove section (ink in the groove), and reference numeral Ie denotes the ink remaining in the liquid flow path.

Thus, in the liquid ejection head of this example, when the liquid is discharged at the step of decreasing of the volume after the bubble has grown to have the maximum volume, it is possible to stabilize the direction of the main liquid droplet at the time of discharge, by a plurality of grooves scattered around the ejection orifice. As a result of that, it is possible to provide a liquid ejection head with no twist in the discharge direction and with a high landing accuracy. Furthermore, since the discharge can stably be performed even when the bubbling is scattered at a high driving frequency, the high speed and high accuracy printing can be realized.

Especially, at the step of decreasing of the volume of a bubble, this bubble is made to communicate with the atmosphere for the first time so that the liquid may be discharged, and therefore, it is possible to prevent the mist that occurs when the liquid droplet is discharged by making the bubble communicate with the atmosphere, and consequently, it is also possible to inhibit the state where the liquid droplet is adhered on the ejection orifice surface, which causes a so-called sudden unejectable state.

Furthermore, as another embodiment of a discharge type recording head capable of being preferably used for the present invention in which the bubble is made to communicate with the atmosphere at the time of discharge, a so-called edge shooter type can be cited, for example, as described in Japanese Patent Registration No. 2,783,647.

The present invention brings on an excellent effect especially in a recording head and a recording apparatus of the ink jet system in which thermal energy is utilized to form a flying liquid droplet so that recording may be performed, among the ink jet recording systems.

As for the typical configuration and principle thereof, for example, a system is preferable, which is performed by using the basic principle disclosed in U.S. Pat. No. 4,723,129 or U.S. Pat. No. 4,740,796. This system can be applied to both the so-called on-demand type and continuous type, and especially in the case of the on-demand type, to an electrothermal converting element arranged corresponding to the sheet and liquid path in which the liquid (ink) is kept, at least one driving signal corresponding to the recording information to give a sudden temperature rising exceeding the nuclear boiling is applied, and consequently, thermal energy is generated in the electrothermal converting element, and film boiling is produced on the heat acting surface of the recording head, and as a result, it is possible to form a bubble in the liquid (ink) corresponding one-to-one to this driving signal, which is effective. By the growth and contraction of this bubble, the liquid (ink) is discharged through the discharging opening, and at least one droplet is formed. When making this driving signal have a pulse-shape, the growth and contraction of the bubble are performed instantly and properly, and therefore, the discharge of liquid (ink) excellent especially in responsibility can be attained, which is more preferable.

As this pulse-shaped driving signal, a signal is suitable, which is described in U.S. Pat. No. 4,463,359 or U.S. Pat. No. 4,345,262. Furthermore, when adopting the condition described in U.S. Pat. No. 4,313,124 of an invention relating to the temperature rising ratio of the above described heat acting surface, a more excellent recording can be performed.

As the configuration of a recording head, the configuration using U.S. Pat. No. 4,558,333 or U.S. Pat. No. 4,459,600 disclosing the configuration where the heat acting section is arranged in a bent area is also included in the present invention, besides the configuration (linear liquid flow path or right-angled liquid flow path) of the combination of the ejection orifice, liquid path, and electrothermal converting element that is disclosed in each of the above described specifications.

In addition to that, the present invention is also effective when adopting a configuration based on Japanese Patent Application Laid-Open No. 59-123670 that discloses a configuration where a common slit serves as the ejection orifice of the electrothermal converting element for a plurality of electrothermal converting elements, or Japanese Patent Application Laid-Open No. 59-138461 that discloses a configuration where the opening hole for absorbing the pressure wave of thermal energy corresponds to the ejection orifice.

Furthermore, a full-line type recording head with a length corresponding to the width of the maximum recording medium that can be recorded by a recording apparatus can have any one of a configuration where the length thereof is fulfilled by the combination of a plurality of recording heads as disclosed in the above described specification and a configuration of one integrally formed recording head, and the present invention can exhibit the above described effect more effectively.

In addition to that, the present invention is effective even in the case of using an exchangeable chip type recording head in which the electrical connection with the apparatus main body and the supply of ink from the apparatus main body can be performed by being mounted on the apparatus main body, or a cartridge type recording head in which the ink tank is integrally provided to the recording head itself.

Furthermore, it is preferable to add recovery means, preliminary auxiliary means or the like for the recording head that is provided as a configuration of a recording apparatus of the present invention, since it can furthermore stabilize the effect of the present invention. When citing these particularly, there are capping means for the recording head, cleaning means, pressurizing or sucking means, preheating means by using an electrothermal converting element or another heating element or the combination thereof, and means of performing a preliminary discharge mode for performing a discharge other than that of recording, which are effective for performing a stable recording.

Furthermore, as a recording mode of the recording apparatus, not only a recording mode of the mainline color such as black only, but also a mode of integrally configuring a recording head or combining a plurality of pieces is possible, and the present invention is also extremely effective for an apparatus that has at least either the compound color of different colors or the full color by color mixture.

In the above described embodiment of the present invention, the description is given letting ink be liquid, but the ink is usually an ink that is solidified at a temperature less than the room temperature and is softened at the room temperature, or in the above described ink jet system, the ink is usually an ink in which the ink itself is thermally adjusted within the range of 30° C. or more and 70° C. or less to thermally control the viscosity of the ink so that it may be within the range of the stable discharge, and therefore, it is sufficient that the ink becomes liquid when giving a used recording signal.

In addition to that, it is also applicable to the present invention to use an ink with a property of being liquefied initially by thermal energy such as an ink that is liquefied by the giving of thermal energy according to a recording signal and that is discharged as a liquid ink, or an ink that starts to be solidified previously at the time of reaching a recording medium, in either the case where the temperature rising because of thermal energy is positively prevented by using that as the energy of changing the state from the solid state to the liquid state of an ink, or the case where an ink that is solidified in the state of being left alone is used for the purpose of preventing the ink from evaporating. In such a case, it is also possible that the ink is in the form of facing to the electrothermal converting element in the state of being kept as a liquid or solid material in a porous sheet recess or a through hole, as described in Japanese Patent Application Laid-Open No. 54-56847 or Japanese Patent Application Laid-Open No. 60-71260. In the present invention, the most effective form for each of the above described inks is a form of performing the above described film boiling system.

Furthermore, in addition to that, as a form of-a recording apparatus according to the present invention, it is also possible to adopt a form of a copying apparatus combined with a reader and further, a form of a facsimile apparatus with the transmitting and receiving function, besides a form of an apparatus that is provided integrally or separately as an image output terminal of information processing equipment such as a word processor or a computer.

Next, the outline of a liquid discharge apparatus on which the above described liquid ejection head is mounted will be described.

Figure 25:
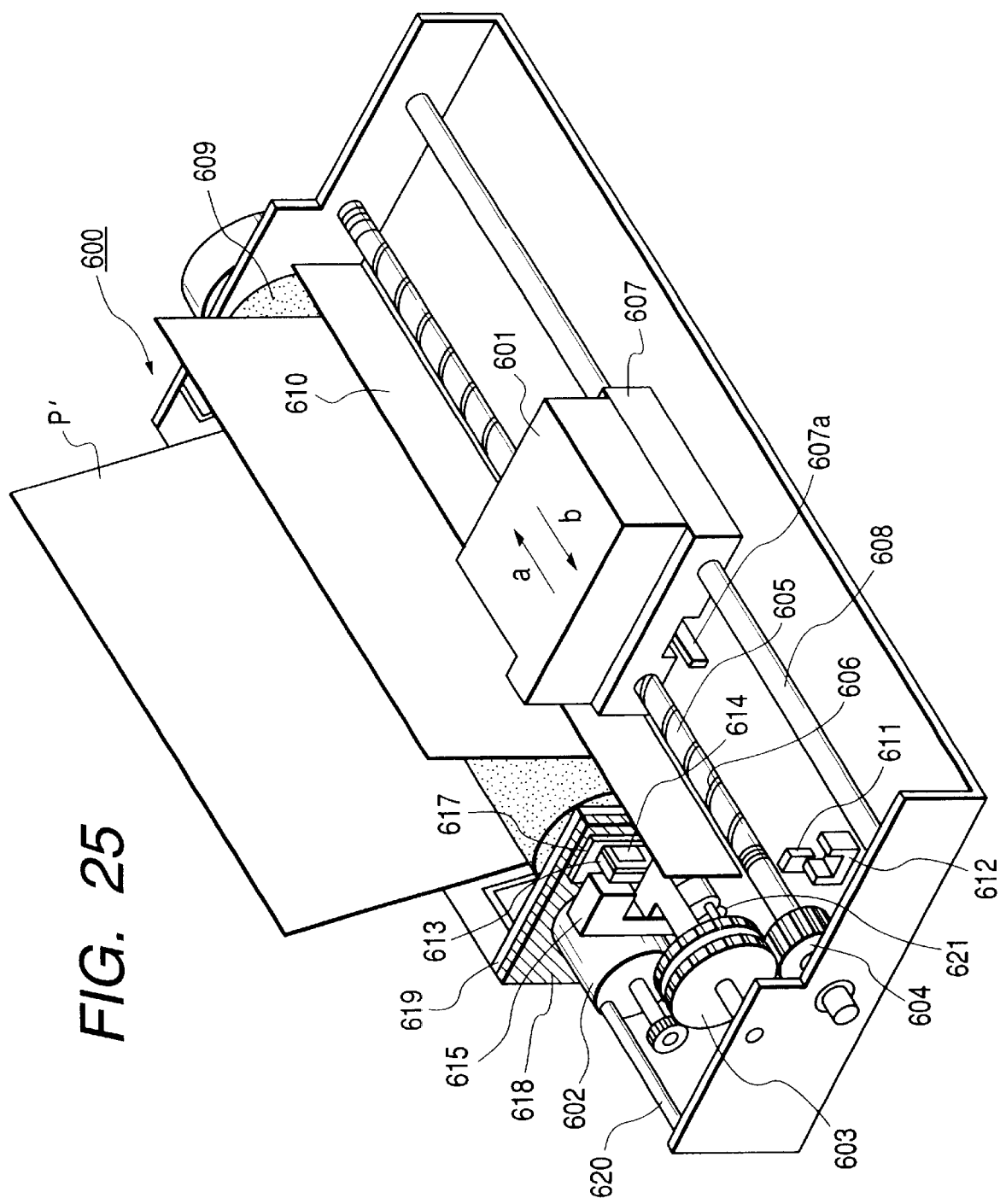
FIG. 25 is a schematic perspective view of an ink-jet recording apparatus 600 as an example of a liquid discharge apparatus to which a liquid ejection head according to the present invention is applicable.

FIG. 25 is a schematic perspective of an ink jet recording apparatus 600 of one example of a liquid discharge apparatus to which a liquid ejection head of the present invention can be mounted and applied.

In FIG. 25, an ink jet head cartridge 601 is a cartridge in which the above described liquid ejection head and an ink tank for keeping the ink to be supplied to this liquid ejection head are integrated. This ink jet head cartridge 601 is mounted on a carriage 607 engaged with a spiral groove 606 of a lead screw 605 rotating with the forward and reverse rotation of a driving motor 602 through driving force transmitting gears 603, 604, and it is reciprocated in the directions shown by arrows a, b along a guide 608 together with the carriage 607 by the power of the driving motor 602. A recording medium P is carried on a platen roller 609 by unillustrated recording medium feeding means, and it is pressed to the platen roller 609 through the moving direction of the carriage 607 by a paper presser plate 610.

Near one end of the lead screw 605, photo couplers 611, 612 are provided. These are home position detecting means for confirming the existence in this area of a lever 607a of the carriage 607 and for performing the switching of the rotational direction of the driving motor 602 or the like.

A support member 613 supports a cap member 614 covering the front surface (ejection orifice surface) having the ejection orifice of the above described ink jet head cartridge 601. Furthermore, ink sucking means 615 sucks the ink that is vacantly discharged from the ink jet head cartridge 601 and is accumulate in the cap member 614. The suction recovery of the ink jet head cartridge 601 is performed through the opening section (not shown in the figure) in the cap by this ink sucking means 615. A cleaning blade 617 for wiping the ejection orifice surface of the ink jet head cartridge 601 is provided so that it may move in the forward and backward directions (directions at right angles to the traveling direction of the above described carriage 607) by a movable member 618. These cleaning blade 617 and movable member 618 are supported by a main body supporting body 619. The cleaning blade 617 is not limited to this form, but it may be another well known cleaning blade.

In the suction recovery operation of the liquid ejection head, a lever 620 for starting the suction is moved with the movement of a cam 621 engaged with the carriage 607, and the driving force from the driving motor 602 is moved and controlled by well known transmitting means such as the clutch shifting. An ink jet recording control section that gives a signal to a heat-generating body provided to the liquid ejection head of the ink jet head cartridge 601 and that governs the driving control of each of the above described mechanisms is provided on the apparatus main body side, and it is not illustrated here.

The ink jet recording apparatus 600 with the above described configuration performs recording onto a recording medium P' that is carried on the platen roller 609 by the unillustrated recording medium feeding means while the ink jet head cartridge 601 reciprocates through the whole width of the recording medium P'.

As described above, according to the present invention, it is possible to provide an ink set for color ink-jet recording ink set that can provide an image of a high printing density and a high quality without producing bleeding or haze in the boundary region between black image and color image even when the black ink and color ink are applied on plain paper by the same one scanning, and an ink jet recording method and recording equipment using this ink set. Furthermore, according to the present invention, it is possible to obtain a high grade image that is excellent in rub-off resistance and line marker resistance though pigment ink is used as black ink.

EXAMPLES

Next, the present invention is more particularly described by referring to Examples and a Comparative Example. Herein, in the following description, part and % are the part and % by weight as long as otherwise specified.

First, to use for preparing black ink, carbon black dispersion C-1 was prepared as follows.

<Preparation of Carbon Black Liquid Dispersion C-1>

Carbon black of 10 g with a surface area of 230 $m^2/g$ and a DBP oil absorption of 70 ml/100 g, and 3-amino-N-ethyl pyridinium bromide of 3.06 g were sufficiently mixed into water of 72 g, and after that, nitric acid of 1.62 g was dripped in this, and was stirred at 70° C. Several minutes after, a solution of 1.07 g nitrite in 5 g water was added thereto, and stirred for one hour. Next, the obtained slurry was filtered by a filter (trade name: Toyo-Roshi No. 2; made by Advantis Ltd.), and the pigment particles were fully washed with water, and dried in an oven at 110° C. After that, water was added to thus obtained pigment, to prepare a pigment dispersion C-1 of a pigment concentration of 10 wt %.

By the above described method, a cationic group represented by the following chemical formula was introduced to the surface of carbon black.

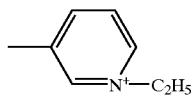

Next, a liquid dispersion MC-1 of the resin encapsulating a coloring material (hereinafter referred to as colored resin) to be used in the black ink of the present invention was prepared by the following procedure.

<Preparation of Colored Resin Dispersion MC-1>

First, materials shown below were mixed and dissolved.

| | |
|---|---|
| C. I. Solvent Black 3 | 10 parts |
| Styrene-N, N-dimethylamino-propyl methacrylate copolymer (molecular weight 40 thousands) | 40 parts |
| Methyl ethyl ketone | 50 parts |

Next, the phase inversion emulsification of the solution was carried out by using acetic acid as a neutralizing agent, and methyl ethyl ketone was removed to give an aqueous dispersion MC-1 of a micro-capsuled colored resin of which solid content was 20% by weight and average particle diameter was 0.08 µm.

The carbon black dispersion C-1 and the colored resin dispersion MC-1 prepared as above were mixed according to the ratio of the solid contents shown in Table 1. After that, glycerin and isopropyl alcohol were added to 16 wt % and 4.0 wt % respectively to obtain Black ink A of which total solid content (carbon black+colored resin) was 8 wt %. Black ink B was prepared in the same manner except that it did not contain the colored resin. In Table 1, C.B./MC represents each final solid content of the carbon black and the colored resin in the ink. That is, in the black ink A, the solid contents of the carbon black and the colored resin were 1.5 wt % and 6.5 wt % respectively.

TABLE 1

| | Black ink characteristics | | |
|---|---|---|---|
| Ink No. | C.B. liquid dispersion | Colored resin | C.B./MC |
| A | C-1 | MC-1 | 1.5/6.5 |
| B | C-1 | Not used | 8.0/0 |

Example 1

Black ink A obtained as described above was used in combination with following color inks as an ink set of Example 1.

(1) Black ink (cationic)

Black ink A (2) Yellow ink (anionic)

| | |
|---|---|
| C. I. Acid Yellow 23 | 3 parts |
| glycerol | 5 parts |
| hexylene glycol | 5 parts |
| urea | 7 parts |
| sodium benzoate | 1.5 parts |
| water | 78.5 parts |

(3) Magenta ink (anionic)

| | |
|---|---|
| C. I. Acid Red 52 | 4 parts |
| 2-pyrrolidone | 7 parts |
| triethylene glycol monomethyl ether | 7 parts |
| urea | 7 parts |
| Acetylenol EH (trade name: made by Kawaken Fine Chemicals Co., Ltd.) | 1 part |
| sodium laurate | 2 parts |
| water | 72 parts |

(4) Cyan ink (anionic)

| | |
|---|---|
| C. I. Direct Blue 199 | 3 parts |
| dipropylene glycol | 8 parts |
| 1,2,6-hexane triol | 7 parts |
| urea | 6 parts |
| ammonium benzoate | 2 parts |
| water | 74 parts |

Example 2

Black ink A obtained as described above was used in combination with color inks having the following composition as an ink set of Example 2.

(1) Black ink (cationic)

Black ink A (2) Yellow ink (anionic)

| | |
|---|---|
| C. I. Acid Yellow 23 | 3 parts |
| glycerol | 5 parts |
| hexylene glycol | 5 parts |
| urea | 7 parts |
| sodium lauryl sulfate | 1.5 parts |
| water | 78.5 parts |

-continued

| (3) Magenta ink (anionic) | |
|---|---|
| C. I. acid red 52 | 4 parts |
| 2-pyrrolidone | 7 parts |
| triethylene glycol monomethyl ether | 7 parts |
| urea | 7 parts |
| Acetylenol EH (trade name: made by Kawaken Fine Chemicals Co., Ltd.) | 1 part |
| sodium benzenesulfonate | 2 parts |
| water | 72 parts |
| (4) Cyan ink (anionic) | |
| C. I. Direct Blue 199 | 3 parts |
| dipropylene glycol | 8 parts |
| 1,2,6-hexane triol | 7 parts |
| urea | 6 parts |
| N-lauroyl methyl taurine sodium salt | 2 parts |
| Water | 74 parts |

Example 3

Black ink A obtained as described above was used in combination with color inks of following compositions as an ink set of Example 3.

| (1) Black ink (cationic) | |
|---|---|
| Black ink A | |
| (2) Yellow ink (anionic) | |
| C. I. Acid Yellow 23 | 3 parts |
| glycerol | 5 parts |
| diethylene glycol | 5 parts |
| urea | 7 parts |
| Acetylenol EH (trade name: made by Kawaken Fine Chemicals Co., Ltd.) | 1 part |
| trisodium naphthalene-1,3,6-trisulfonate | 2 parts |
| water | 77 parts |
| (3) Magenta ink (anionic) | |
| C. I. Acid Red 52 | 4 parts |
| 2-pyrrolidone | 7 parts |
| triethylene glycol monomethyl ether | 7 parts |
| urea | 7 parts |
| Acetylenol EH (trade name: made by Kawaken Fine Chemicals Co., Ltd.) | 1 part |
| trisodium naphthalene-1,3,6-trisulfonate | 2 parts |
| water | 72 parts |
| (4) Cyan ink (anionic) | |
| C. I. Direct Blue 199 | 3 parts |
| propylene glycol | 8 parts |
| 1,2,6-hexane triol | 7 parts |
| urea | 6 parts |
| Acetylenol EH (trade name: made by Kawaken Fine Chemicals Co., Ltd.) | 1 part |
| disodium naphthalene-1,5-disulfonate | 2 parts |
| water | 73 parts |

Comparative Example 1

Black ink B obtained as described above was used in combination with color inks of the following compositions as an ink set of Comparative Example 1.

| (1) Black ink (cationic) | |
|---|---|
| Black ink B | |
| (2) Yellow ink (anionic) | |
| C. I. Acid Yellow 23 | 3 parts |
| glycerol | 5 parts |
| diethylene glycol | 5 parts |
| urea | 7 parts |
| Acetylenol EH (trade name: made by Kawaken Fine Chemicals Co., Ltd.) | 1 part |
| water | 79 parts |
| (3) Magenta ink (anionic) | |
| C. I. Acid Red 52 | 4 parts |
| 2-pyrrolidone | 7 parts |
| triethylene glycol monomethyl ether | 7 parts |
| urea | 7 parts |
| Acetylenol EH (trade name: made by Kawaken Fine Chemicals Co., Ltd.) | 1 part |
| water | 74 parts |
| (4) Cyan ink (anionic) | |
| C. I. Direct Blue 199 | 3 parts |
| propylene glycol | 8 parts |
| 1,2,6-hexane triol | 7 parts |
| urea | 6 parts |
| Acetylenol EH (trade name: made by Kawaken Fine Chemicals Co., Ltd.) | 1 part |
| water | 75 parts |

Each ink set of the Examples 1 to 3 and Comparative Example 1 was put into an ink cartridge, the black ink into a BC-60 cartridge (a product of Canon), and each color ink into a BC-62 cartridge (Canon), to prepare the ink jet cartridges.

Next, the ink jet cartridges prepared as above were mounted on an ink-jet recording apparatus BJF-800 (Canon), which discharges ink by applying thermal energy to the ink according to recording signals, to perform printing tests. Evaluation was carried out as follows. Incidentally, the BJF-800 used the evaluation test had been modified so that black ink and color ink are applied in one and the same scan, and the color ink is applied immediately after the black ink application to a region contiguous to the black region.

(1) Bleeding Between Black Ink and Color Ink

In the above printing test, two kind of plain paper, Copying Paper PB PAPER (Canon) and 4024 PAPER (Xerox), were used.

Evaluation Method and Criteria

Using each ink set and two kind of paper, a solid black image was printed and immediately after that, the solid yellow or magenta or cyan image was printed to be contiguous. The evaluation criteria are as follows and the result is shown in Table 2.

A: No bleeding is visually recognized in all boundaries.

B: Although slight bleeding is visually observed, no problem in practical use.

C: Although a little bleeding is visually observed, it is acceptable.

D: Marked bleeding is visually observed.

TABLE 2

| | Evaluated Result |
|---|---|
| Example 1 | C |
| Example 2 | B |
| Example 3 | A |
| Comparative Example 1 | D |

(2) Rub-off Resistance

Four hours after the printing of a solid image as in the above bleeding test, silbon paper was placed on the print, and a weight of 1 kg having a bottom area of 5 cm×5 cm was placed on the silbon paper over the printed area. The silbon paper was then pulled out from under the weight, and it was visually observed whether the unprinted area (white area) of the printed paper and the silbon paper were stained by friction between the print and the silbon paper or not. The rub-off resistance was ranked in accordance with the following evaluation criteria:

A: No stain was observed both in the white area and on the silbon paper;

B: Stain was observed on the silbon paper alone; and

C: Stain was observed both in the white are and on silbon paper.

TABLE 3

| Evaluation result | |
| --- | --- |
| Example 1 | A |
| Example 2 | A |
| Example 3 | A |
| Comparative Example 1 | C |

(3) Line Marker Resistance

One hour after the printing of characters with black ink, the character portion was marked once under ordinary writing pressure with a yellow fluorescent pen, Spot Lighter Yellow, (trade name; Pilot), whereby the resistance to line marker was evaluated in accordance with the following evaluation criteria:

A: Neither bleeding nor stain was observed in white paper area, and the pen point was also not stained;

B: No stain in white area, but a pen point was somewhat stained; and

C: Stain in white area was observed.

TABLE 4

| Evaluation result | |
| --- | --- |
| Example 1 | A |
| Example 2 | A |
| Example 3 | A |
| Comparative Example 1 | C |

What is claimed is:

1. An ink set comprising only one black ink for recording a black image and a color ink for recording a color image, wherein the black ink comprises:

a pigment having a cationic group or a pigment and a pigment dispersant having a cationic group; and a resin encapsulating a coloring material;

wherein the color ink comprises an anionic dye and an anionic substance derived from an organic acid salt;

whereby bleed at a boundary between the black image and the color image is reduced by an ionic reaction between the cationic group in the black ink and the anionic dye and the anionic substance in the color ink.

2. The ink set according to claim 1, wherein the pigment is carbon black.

3. The ink set according to claim 1, wherein the pigment is a self-dispersible carbon black having at least one cationic hydrophilic group bonded to a surface thereof directly or via another atomic group.

4. The ink set according to claim 1, wherein the coloring material encapsulated in the resin is an oil-soluble dye or a second pigment.

5. The ink set according to claim 1, wherein the resin encapsulating the coloring material has a cationic hydrophilic group on a surface thereof.

6. The ink set according to claim 1, wherein the coloring material has substantially the same color as the pigment.

7. The ink set according to claim 1, wherein the coloring material is encapsulated by a microcapsule made of the resin.

8. The ink set according to claim 1, wherein the anionic substance has a carboxyl group.

9. The ink set according to claim 1, wherein the anionic substance has a sulfo group.

10. The ink set according to claim 9, wherein the anionic substance has a plurality of sulfo groups.

11. The ink set according to claim 1, wherein the anionic substance in the color ink is an aromatic compound substituted with a sulfo group on an aromatic ring.

12. The ink set according to claim 1, wherein the anionic dye in the color ink is a dye having a sulfo group.

13. The ink set according to claim 1, wherein the ink set is used for ink jet recording.

14. A recording unit comprising:

a first ink container containing the black ink of claim 1; and a second ink container containing the color ink of claim 1.

15. An ink cartridge comprising:

a first ink container containing the black ink of claim 1; and a second ink container containing the color ink of claim 1.

16. An ink jet recording apparatus for reducing bleed at a boundary between a black image and a color image, comprising the ink set of claim 1, an ink jet head for ejecting the black and color inks of the ink set according to claim 1 respectively, and means for controlling the ejection of the respective inks so that the black and color inks react with each other ionically at the boundary.

17. A process for forming an image including a black image and a color image adjacent the black image, comprising the steps of:

forming the black image by ejecting only one black ink by an ink jet method; and forming the color image by ejecting a color ink by an ink jet method, wherein the black ink comprises a pigment having a cationic group or a pigment and a pigment-dispersant having a cationic group, and a resin encapsulating a coloring material, and the color ink comprises an anionic dye and an anionic substance derived from an organic acid salt, and wherein the cationic group in the ejected black ink and the anionic dye and the anionic substance in the color ink react ionically at a boundary of the black image and the color image.

18. The ink jet recording method according to claim 17, wherein ink is ejected in droplets by applying thermal energy to the ink.

19. A method for alleviating bleeding in a boundary between a black image formed by an ink-jet method with only one cationic black ink and a color image formed by an ink-jet method with an anionic color ink, the black ink comprising a pigment having a cationic group or a pigment and a pigment-dispersant having a cationic group and a resin encapsulating a coloring material, the color ink comprising an anionic dye and an anionic substance derived from an organic acid salt, the method comprising the step of reacting the cationic group in the black ink and the anionic dye and the anionic substance in the color ink ionically at the boundary.

* * * * *